(12) United States Patent     (10) Patent No.:   US 12,603,335 B2

Goodman et al.     (45) Date of Patent:    Apr. 14, 2026

---

(54) SINGLE BATTERY PACK INVERTER

(71) Applicant: MILWAUKEE ELECTRIC TOOL CORPORATION, Brookfield, WI (US)

(72) Inventors: Alexander J. Goodman, Milwaukee, WI (US); Andrew Lentz, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 646 days.

(21) Appl. No.: 17/206,951

(22) Filed: Mar. 19, 2021

(65) Prior Publication Data

US 2021/0296710 A1     Sep. 23, 2021

Related U.S. Application Data

(60) Provisional application No. 62/991,817, filed on Mar. 19, 2020.

(51) Int. Cl.
    *H01M 10/46*     (2006.01)
    *H01M 50/204*     (2021.01)
    (Continued)

(52) U.S. Cl.
    CPC ......... *H01M 10/46* (2013.01); *H01M 50/204* (2021.01); *H01M 50/247* (2021.01); *H02M 7/003* (2013.01)

(58) Field of Classification Search
    CPC .. H01M 50/204; H01M 50/20; H01M 50/247; H01M 10/46; H02M 7/003
    See application file for complete search history.

(56) References Cited

U.S. PATENT DOCUMENTS

| | | |
|---|---|---|
| D279,285 S | 6/1985 | Schwartz |
| D354,267 S | 1/1995 | Severinsky |

(Continued)

FOREIGN PATENT DOCUMENTS

| | | |
|---|---|---|
| JP | H0499688 U | 8/1992 |
| JP | 2006326753 A | 12/2006 |

(Continued)

OTHER PUBLICATIONS

Machine translation of KR 101160784 B1 (Year: 2012).*

(Continued)

*Primary Examiner* — Matthew W Van Oudenaren

(74) *Attorney, Agent, or Firm* — Michael Best & Friedrich LLP

(57) ABSTRACT

Embodiments described herein provide a single battery pack inverter that reduces cost and improves user experience at a worksite. Single battery pack inverters described herein provide a housing, a battery pack interface provided on a first surface of the housing to receive a power tool battery pack, an output interface provided on a second surface of the housing for powering external devices, and an inverter circuit in the housing for converting direct-current (DC) power from the power tool battery pack to alternating-current (AC) power provided at the AC outlet. The single battery pack inverters also include a hanging hook provided on the housing and configured to be pivotable between a first position and a second position. The hanging hook enables the single battery pack inverter to hang onto a support when the hanging hook is in the second position.

17 Claims, 28 Drawing Sheets

(51) Int. Cl.
  *H01M 50/247* (2021.01)
  *H02M 7/00* (2006.01)

(56) References Cited

U.S. PATENT DOCUMENTS

| | | | |
|---|---|---|---|
| 5,982,138 | A | 11/1999 | Krieger |
| 6,188,201 | B1 | 2/2001 | Chang |
| 6,191,498 | B1 | 2/2001 | Chang |
| D440,540 | S | 4/2001 | Loh |
| 6,573,621 | B2 | 6/2003 | Neumann |
| 6,577,098 | B2 | 6/2003 | Griffey et al. |
| 6,799,993 | B2 | 10/2004 | Krieger et al. |
| D516,020 | S | 2/2006 | Wong et al. |
| D604,694 | S | 11/2009 | Aglassinger |
| D632,649 | S | 2/2011 | Scheucher et al. |
| D640,190 | S | 6/2011 | Aglassinger |
| D640,975 | S | 7/2011 | Okuda et al. |
| 7,990,102 | B2 | 8/2011 | Scheucher |
| D662,053 | S | 6/2012 | Inskeep |
| 8,203,237 | B1 | 6/2012 | Cowles |
| D677,222 | S | 3/2013 | Haapaniemi et al. |
| 8,729,744 | B2 | 5/2014 | Ro |
| D706,214 | S | 6/2014 | Benn |
| D706,217 | S | 6/2014 | McKune et al. |
| 8,994,336 | B2 | 3/2015 | Brotto et al. |
| 9,130,371 | B2 | 9/2015 | Yang |
| 9,166,422 | B2 | 10/2015 | Brotto et al. |
| 9,254,563 | B2 | 2/2016 | Yamaguchi et al. |
| 9,337,763 | B2 | 5/2016 | Funabashi et al. |
| 9,344,008 | B2 | 5/2016 | Brotto et al. |
| 9,345,156 | B2 | 5/2016 | Ogura et al. |
| D761,727 | S | 7/2016 | Arends et al. |
| 9,381,638 | B2 | 7/2016 | Nakayama et al. |
| D780,687 | S | 3/2017 | Taniguchi et al. |
| 9,660,229 | B2 | 5/2017 | Chellew et al. |
| D790,453 | S | 6/2017 | Tinius |
| D804,416 | S | 12/2017 | Dilley |
| D806,027 | S | 12/2017 | Ceravalo |
| 9,899,853 | B2 | 2/2018 | Marinov et al. |
| D816,605 | S | 5/2018 | Rowe et al. |
| D819,562 | S | 6/2018 | Waldron |
| 9,991,706 | B2 | 6/2018 | Brotto et al. |
| D823,800 | S | 7/2018 | Inskeep |
| 10,044,197 | B2 | 8/2018 | Fry et al. |
| D841,572 | S | 2/2019 | Gilpatrick et al. |
| D844,558 | S | 4/2019 | Taniguchi et al. |
| D853,319 | S | 7/2019 | Nommensen et al. |
| D853,955 | S | 7/2019 | Oliver et al. |
| D863,223 | S | 10/2019 | Zeng |
| 2006/0038535 | A1* | 2/2006 | Lang ..................... H02J 7/0063 |
| | | | 320/112 |
| 2008/0265678 | A1* | 10/2008 | Brotto ................... H02J 7/0042 |
| | | | 307/46 |
| 2010/0129701 | A1 | 5/2010 | Murayama et al. |
| 2011/0101794 | A1* | 5/2011 | Schroeder .......... H01M 50/247 |
| | | | 320/101 |
| 2013/0257346 | A1 | 10/2013 | Jakins et al. |
| 2013/0285476 | A1 | 10/2013 | Nakano et al. |
| 2015/0162774 | A1 | 6/2015 | Reid et al. |
| 2016/0056731 | A1 | 2/2016 | Brotto et al. |
| 2016/0099575 | A1 | 4/2016 | Velderman et al. |
| 2016/0099590 | A1 | 4/2016 | Velderman et al. |
| 2016/0197504 | A1 | 7/2016 | Hsia et al. |
| 2017/0033598 | A1 | 2/2017 | Shen et al. |
| 2017/0040803 | A1 | 2/2017 | Peters |
| 2018/0048159 | A1 | 2/2018 | Narla et al. |
| 2018/0054064 | A1 | 2/2018 | Narla et al. |
| 2018/0102706 | A1 | 4/2018 | Gao et al. |
| 2018/0198286 | A1 | 7/2018 | Gawthorp |
| 2018/0323621 | A1 | 11/2018 | Fry et al. |
| 2019/0181407 | A1 | 6/2019 | Harris et al. |
| 2019/0296290 | A1 | 9/2019 | Hansen et al. |
| 2019/0356147 | A1 | 11/2019 | Mueckl et al. |

FOREIGN PATENT DOCUMENTS

| | | | |
|---|---|---|---|
| JP | 2013021128 | A | 1/2013 |
| JP | 2013045691 | A | 3/2013 |
| KR | 101160784 | B1 | 6/2012 |
| WO | 2013001909 | A1 | 1/2013 |
| WO | 2017211324 | A1 | 12/2017 |
| WO | 2018098441 | A1 | 5/2018 |

OTHER PUBLICATIONS

International Search Report and Written Opinion for Application No. PCT/US2021/023197 dated Jul. 9, 2021 (15 pages).
Extended European Search Report for Application No. 21772514.2 dated Mar. 20, 2024 (9 pages).
Silver Cymbal, "Ultimate Home Generator?—Ecoflow Delta / Portable Backup Power," <https://www.youtube.com/watch?v=YyMonPCxzog> YouTube video dated Oct. 16, 2019 (3 pages).

\* cited by examiner

24/28

SINGLE BATTERY PACK INVERTER

RELATED APPLICATIONS

This application claims the benefit of U.S. Provisional Patent Application No. 62/991,817, filed on Mar. 19, 2020, the entire content of which is hereby incorporated by reference.

SUMMARY

Users of power tools, outdoor tools, and other powered equipment utilize a wide range of personal electronics on and off a worksite, including low-powered AC products. In some situations, AC outlets may not be available at a worksite for charging or powering personal electronics. Such scenarios may force the user to obtain power from distant locations where reliable power is available (e.g., through extension cords) or to utilize fuel-based power generators (which may be heavy and loud). This may result in decreases in productivity, decreases in portability, continual inconvenience, an overall poor user experience, etc. Additionally, large power generators are expensive, heavy, and further decrease the user experience.

Embodiments described herein provide a single battery pack inverter that reduces cost and improves user experience at a worksite. Specifically, the single battery pack inverter is a portable device that may be carried by the user between different personal sites and worksites to power tools and personal electronics of the user.

Single battery pack inverters described herein provide a housing, a battery pack interface provided on the housing to receive a power tool battery pack, an output interface provided on the housing for powering one or more external devices, an inverter circuit in the housing and configured to convert direct-current (DC) power from the power tool battery pack to alternating-current (AC) power provided at the output interface, and a hanging hook provided on the housing and configured to be pivotable between a first position and a second position. The hanging hook enables the single battery pack inverter to be supported on a support when the hanging hook is in the second position. The hanging hook is positioned on a surface of the housing when the hanging hook is in the first position.

Single battery pack inverters described herein provide a housing, a battery pack interface provided on a first surface of the housing and configured to receive a power tool battery pack, an output interface provided on a second surface of the housing for powering external devices, and an inverter circuit in the housing for converting direct-current (DC) power from the power tool battery pack to alternating-current (AC) power provided at the output interface. The second surface is provided on an opposite side of the housing as the first surface.

Single battery pack inverters described herein provide a housing, a battery pack interface provided on a first surface of the housing and configured to receive a power tool battery pack, an output interface provided on a second surface of the housing for powering external devices, and an inverter circuit in the housing for converting direct-current (DC) power from the power tool battery pack to alternating-current (AC) power provided at the AC outlet. The second surface provided on an opposite side of the housing as the first surface. The output interface includes an AC outlet and a DC outlet.

Single battery pack inverters described herein provide a housing, a battery pack interface provided on a first surface of the housing and configured to receive a power tool battery pack, an output interface provided on a second surface of the housing for powering external devices, a user interface provided on the second surface of the housing, and an inverter circuit in the housing for converting direct-current (DC) power from the power tool battery pack to alternating-current (AC) power provided at the AC outlet. The second surface provided on an opposite side of the housing as the first surface. The output interface includes an AC outlet and a DC outlet. The user interface includes an overload indicator configured to be illuminated when a load output of the single battery pack inverter exceeds a predetermined load threshold and an over-temperature indicator configured to be illuminated when a temperature of the single battery pack inverter exceeds a predetermined temperature threshold.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein relate to a single battery pack inverter to power alternating-current (AC) corded devices and/or direct-current (DC) corded devices.

FIGS. 1-14 illustrate a single battery pack inverter 100 powered by a power tool battery pack 105. The single battery pack inverter 100 is operable to power different AC devices (e.g., power tools, lights, and the like) and DC devices (e.g., USB powered devices).

The battery pack 105 may include one or more cell strings, each having a number (e.g., 5) of battery cells connected in series to provide a desired discharge output (e.g., a nominal voltage [e.g., 18V] and current capacity). The battery pack 105 may include a number of cell strings connected in parallel (e.g., a single cell string "5S1P," two cell strings "5S2P," three cell strings "5S3P," etc.). In other embodiments, other combinations (series, parallel, combination series-parallel configurations) of battery cells are also possible. Each battery cell may have a nominal voltage between 3 V and 5 V and a nominal capacity between 1.5 Ah and 5 Ah. The battery cells may be any rechargeable battery cell chemistry type, such as, for example Lithium (Li), Lithium-ion (Li-ion), another Lithium-based chemistry, Nickel-Cadmium (NiCd), Nickel-metal Hydride (NiMH), etc. A similar battery pack 105 is described and illustrated in U.S. Patent Application Publication No. 2019/0044110, filed Jul. 25, 2018, entitled "HIGH POWER BATTERY-POW-ERED SYSTEM," the entire contents of which are hereby incorporated by reference.

Figure 1:
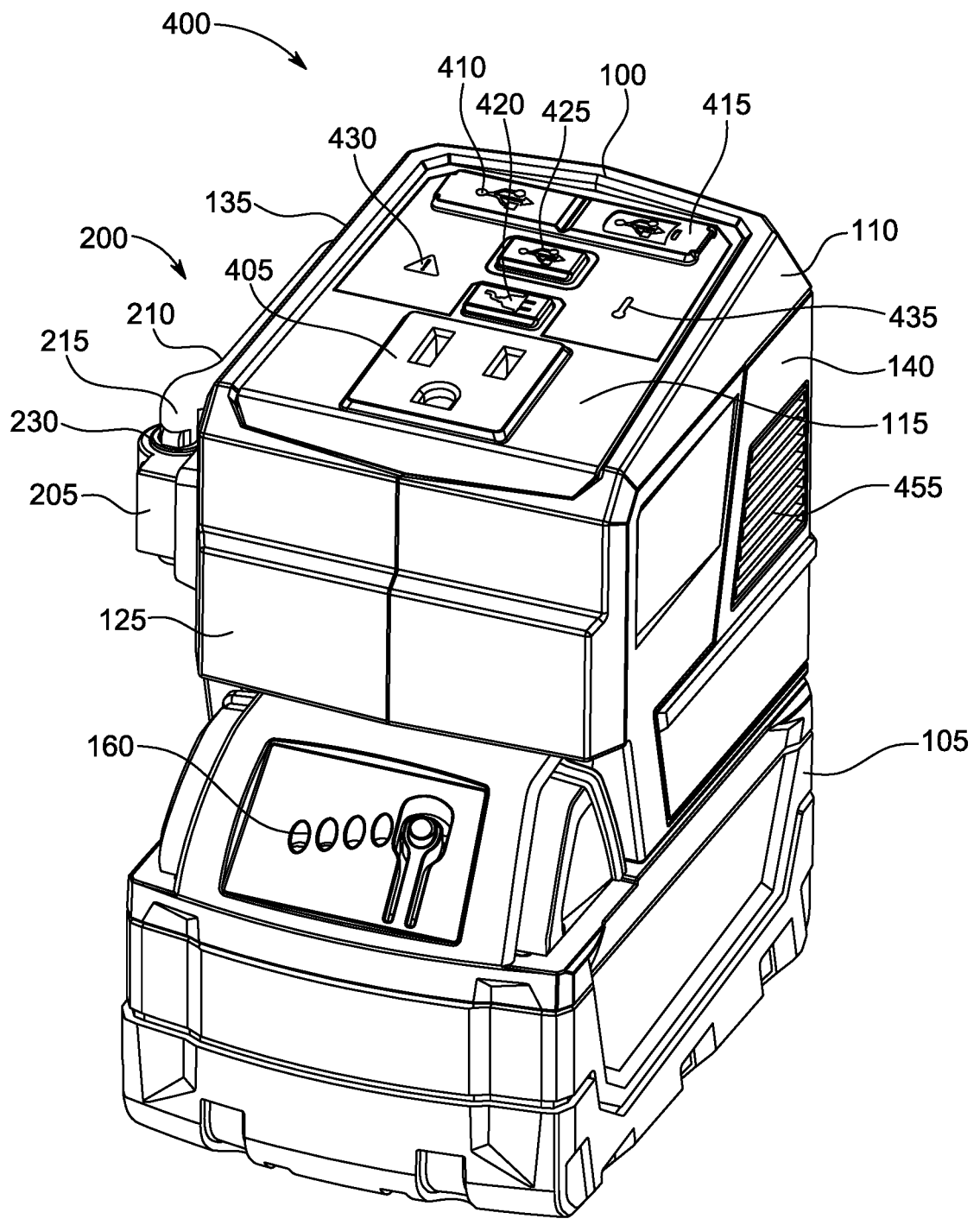
FIG. 1 is a front perspective view of a single battery pack inverter connected to a battery pack in accordance with some embodiments.
Figure 2:
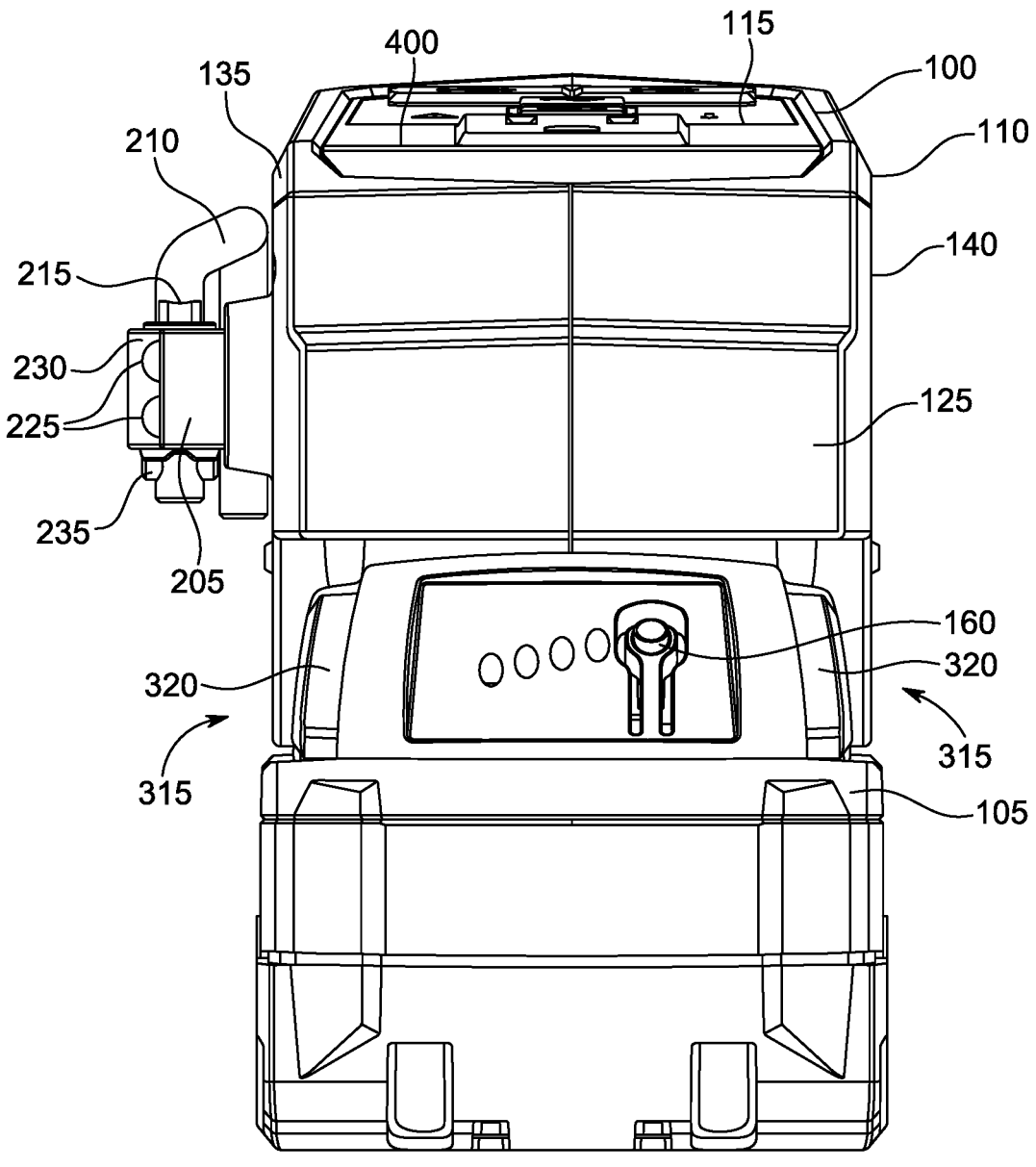
FIG. 2 is a front view of the single battery pack inverter of FIG. 1 in accordance with some embodiments.
Figure 3:
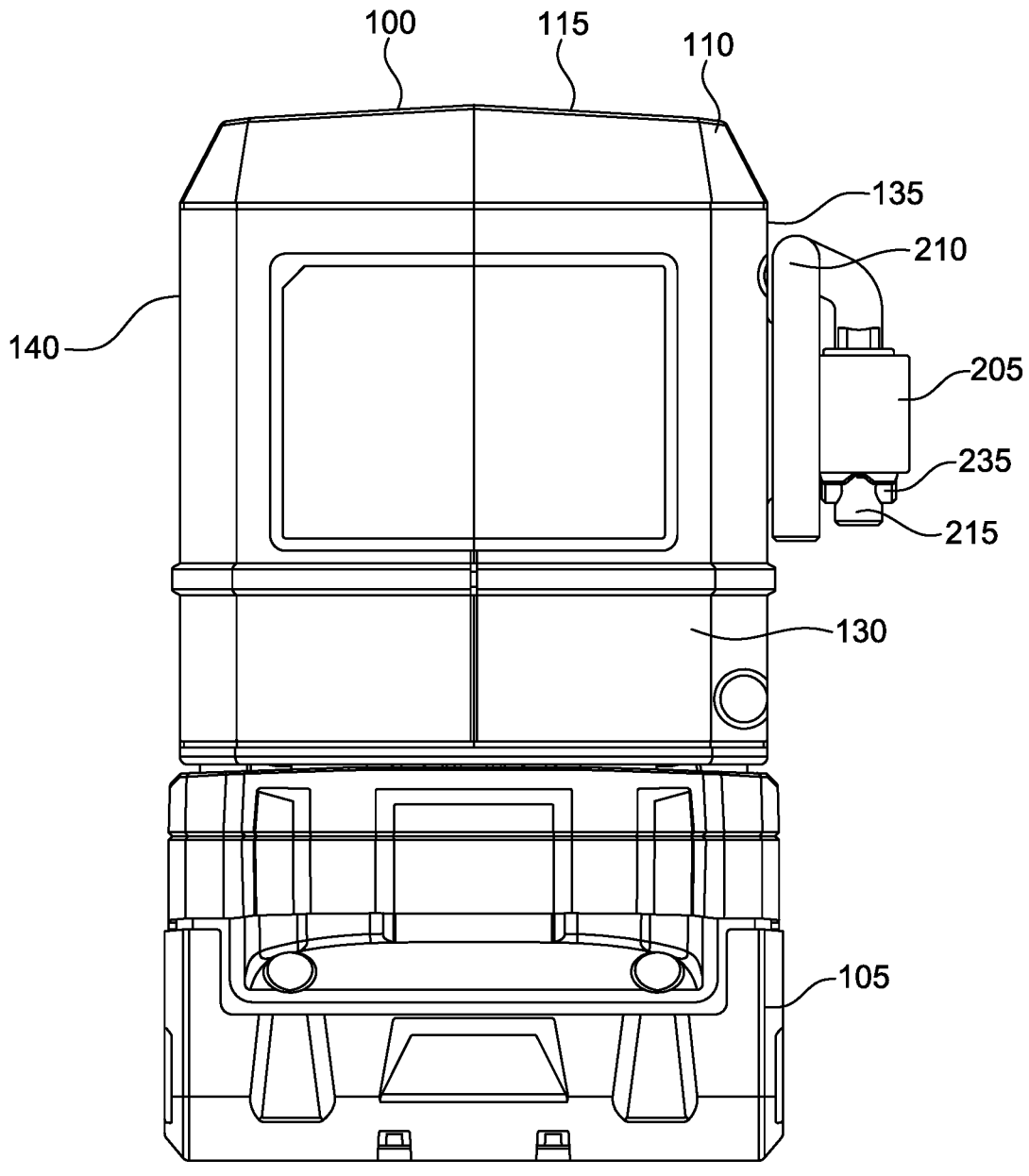
FIG. 3 is a rear view of the single battery pack inverter of FIG. 1 in accordance with some embodiments.
Figure 4:
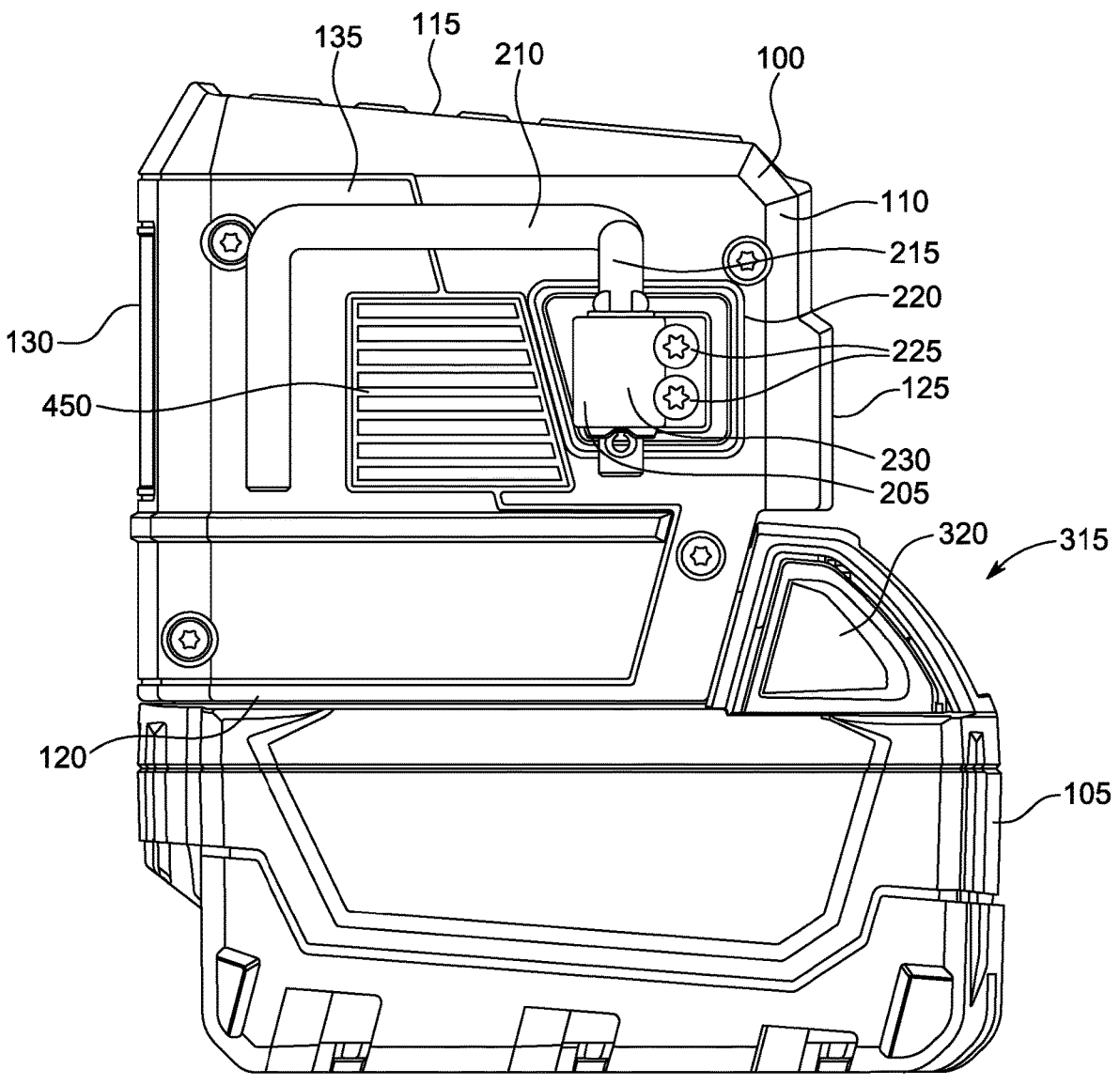
FIG. 4 is a first side view of the single battery pack inverter of FIG. 1 in accordance with some embodiments.
Figure 5:
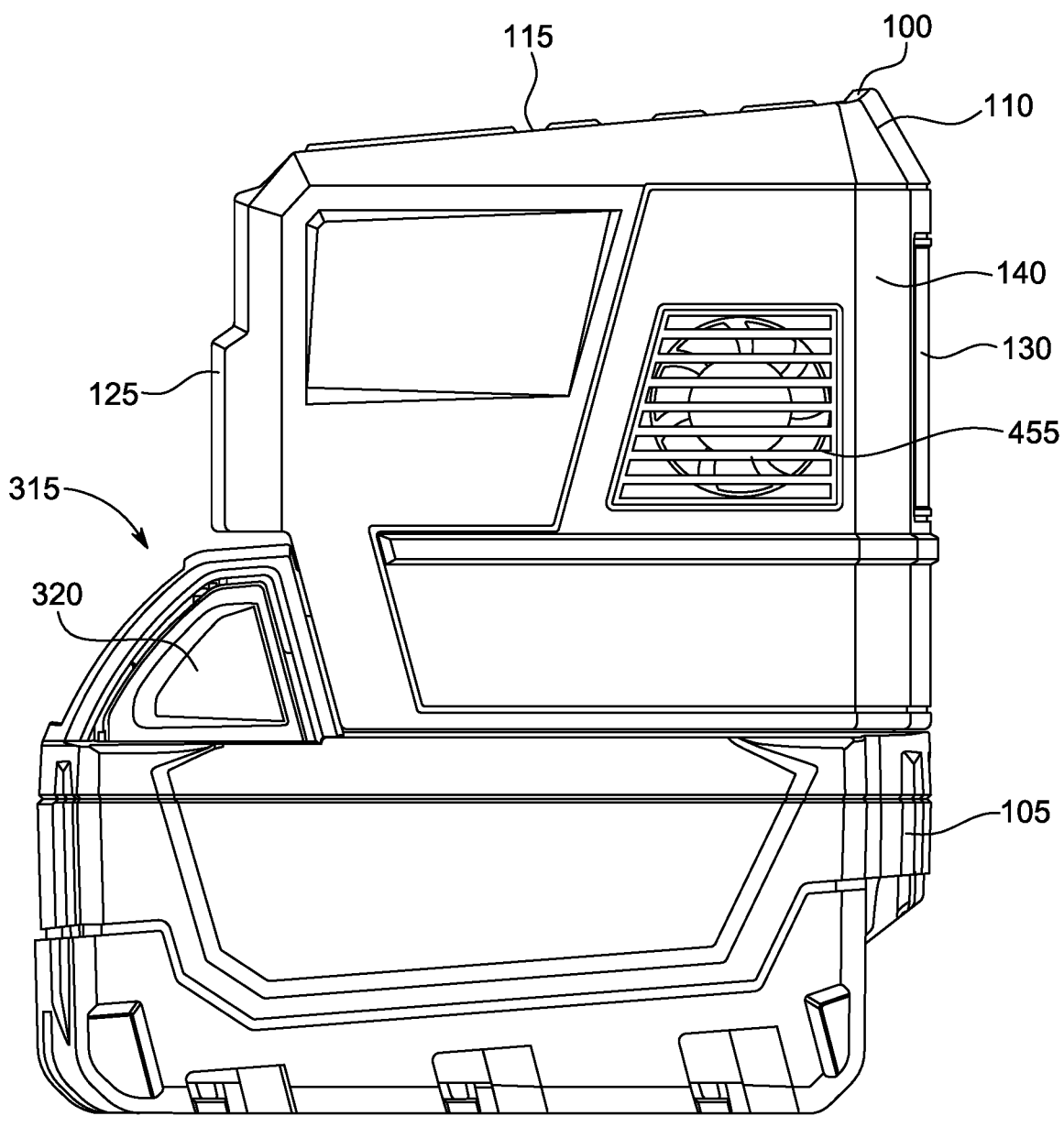
FIG. 5 is a second side view of the single battery pack inverter of FIG. 1 in accordance with some embodiments.
Figure 6:
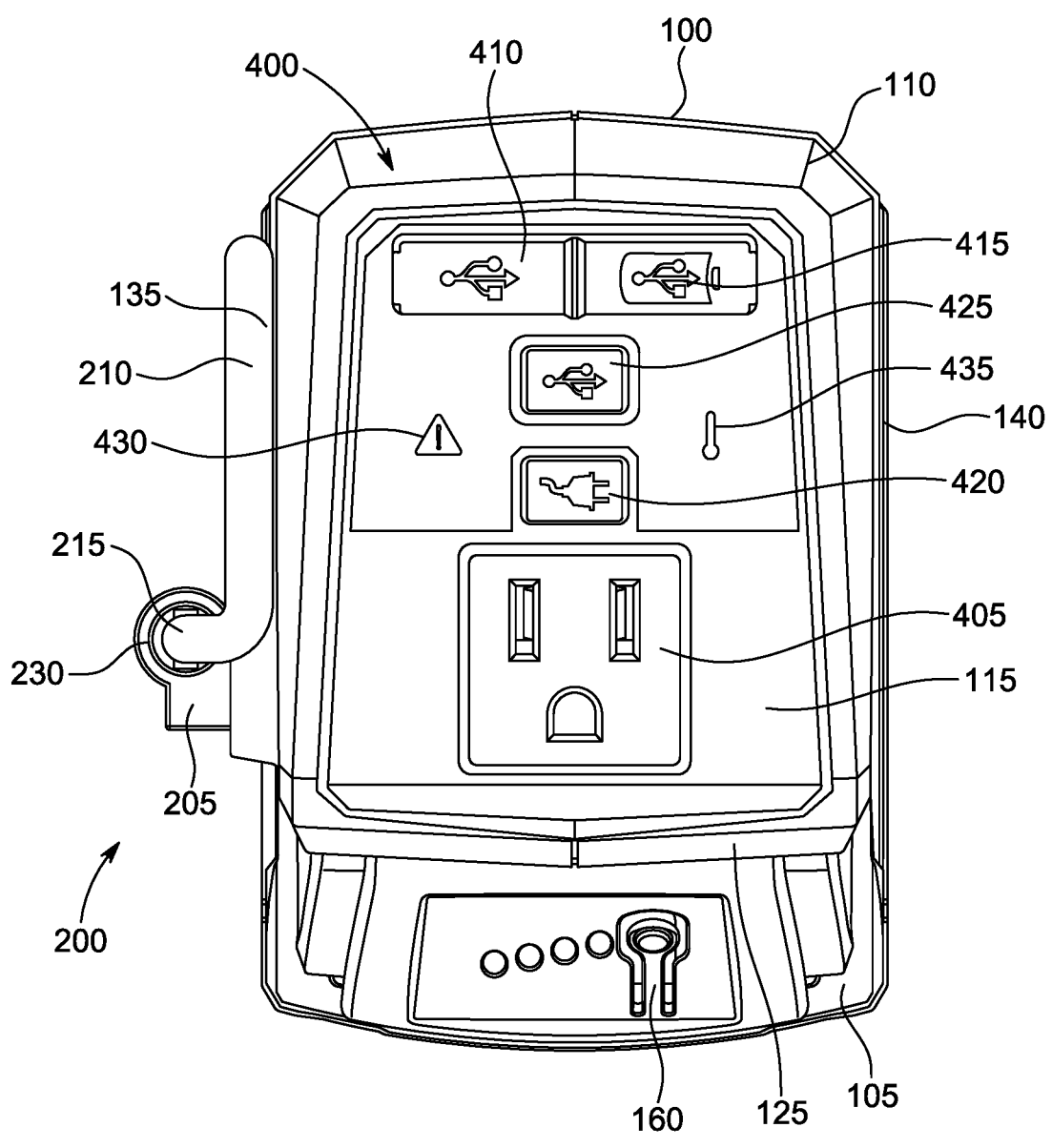
FIG. 6 is a top view of the single battery pack inverter of FIG. 1 in accordance with some embodiments.
Figure 7:
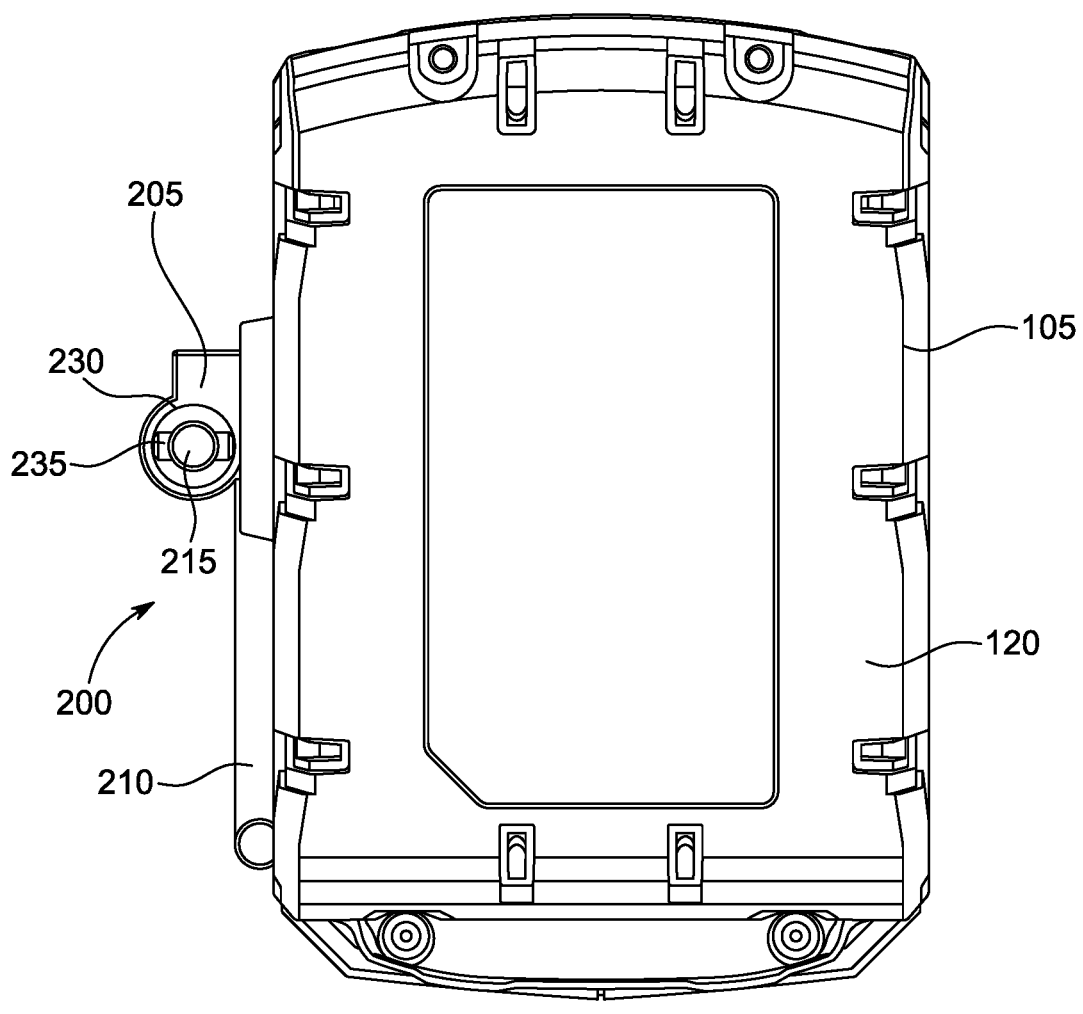
FIG. 7 is a bottom view of the single battery pack inverter of FIG. 1 in accordance with some embodiments.
Figure 8:
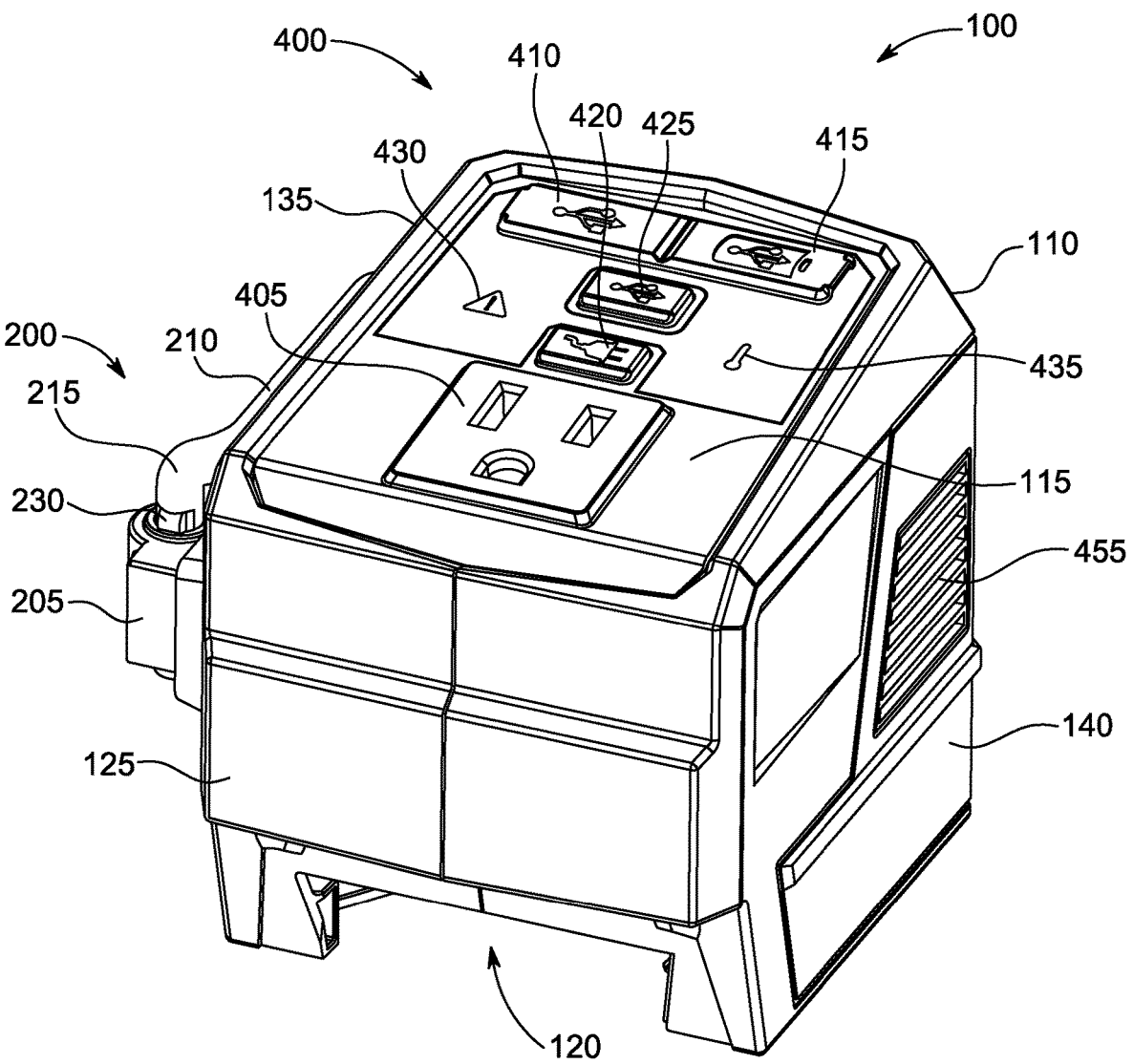
FIG. 8 is a front perspective view of the single battery pack inverter of FIG. 1 with a battery pack removed in accordance with some embodiments.
Figure 9:
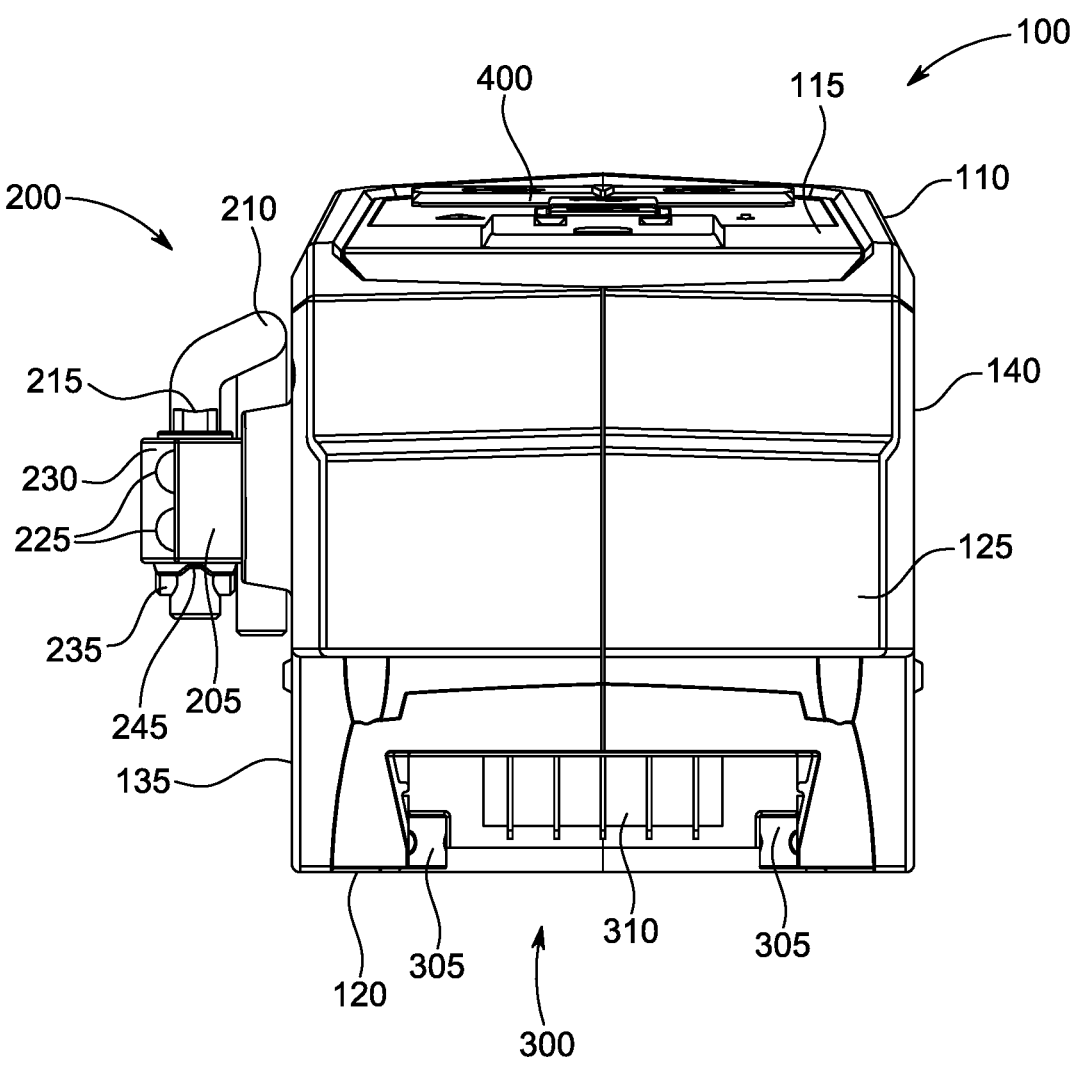
FIG. 9 is a front view of the single battery pack inverter of FIG. 8 in accordance with some embodiments.
Figure 10:
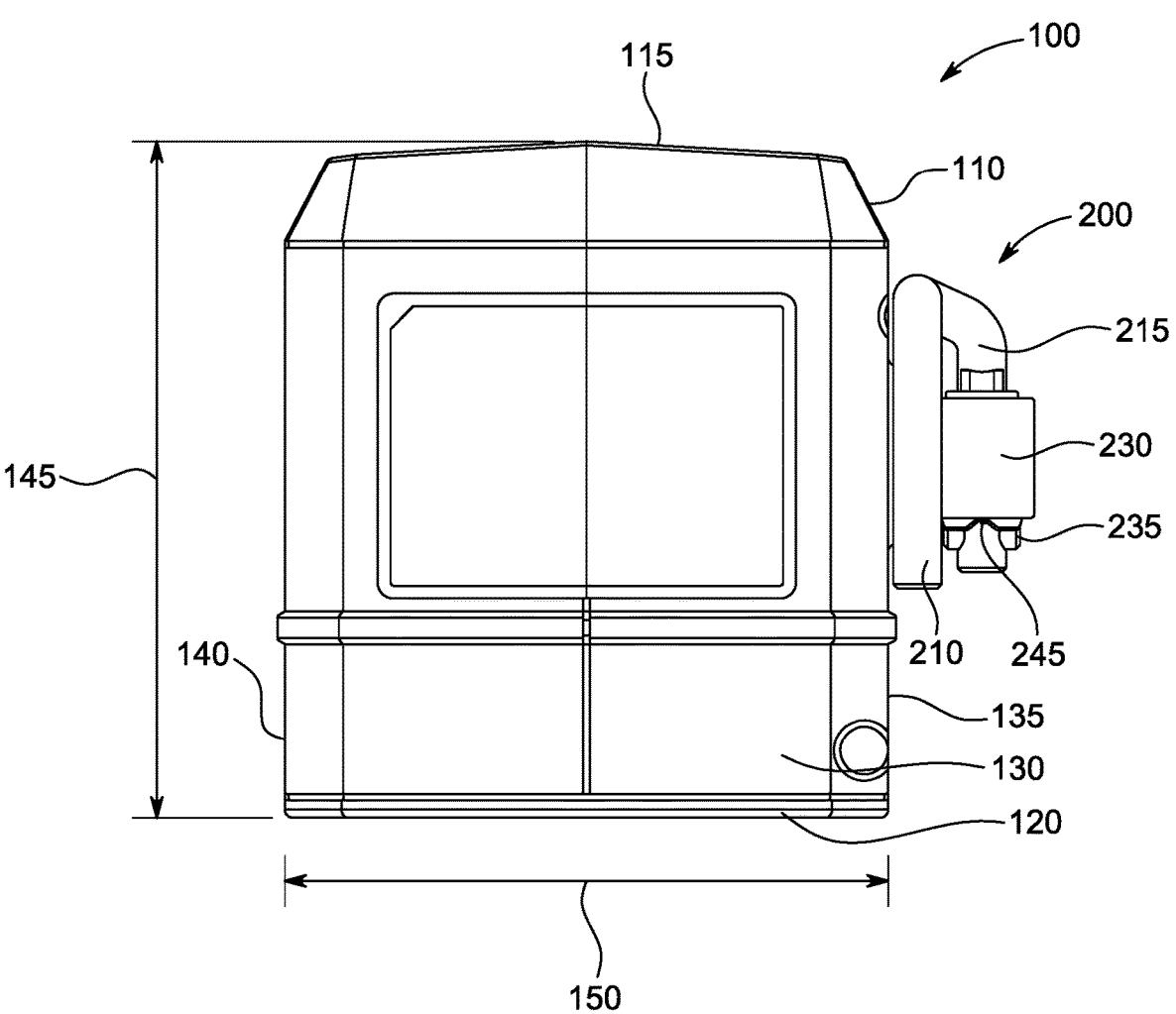
FIG. 10 is a rear view of the single battery pack inverter of FIG. 8 in accordance with some embodiments.
Figure 11:
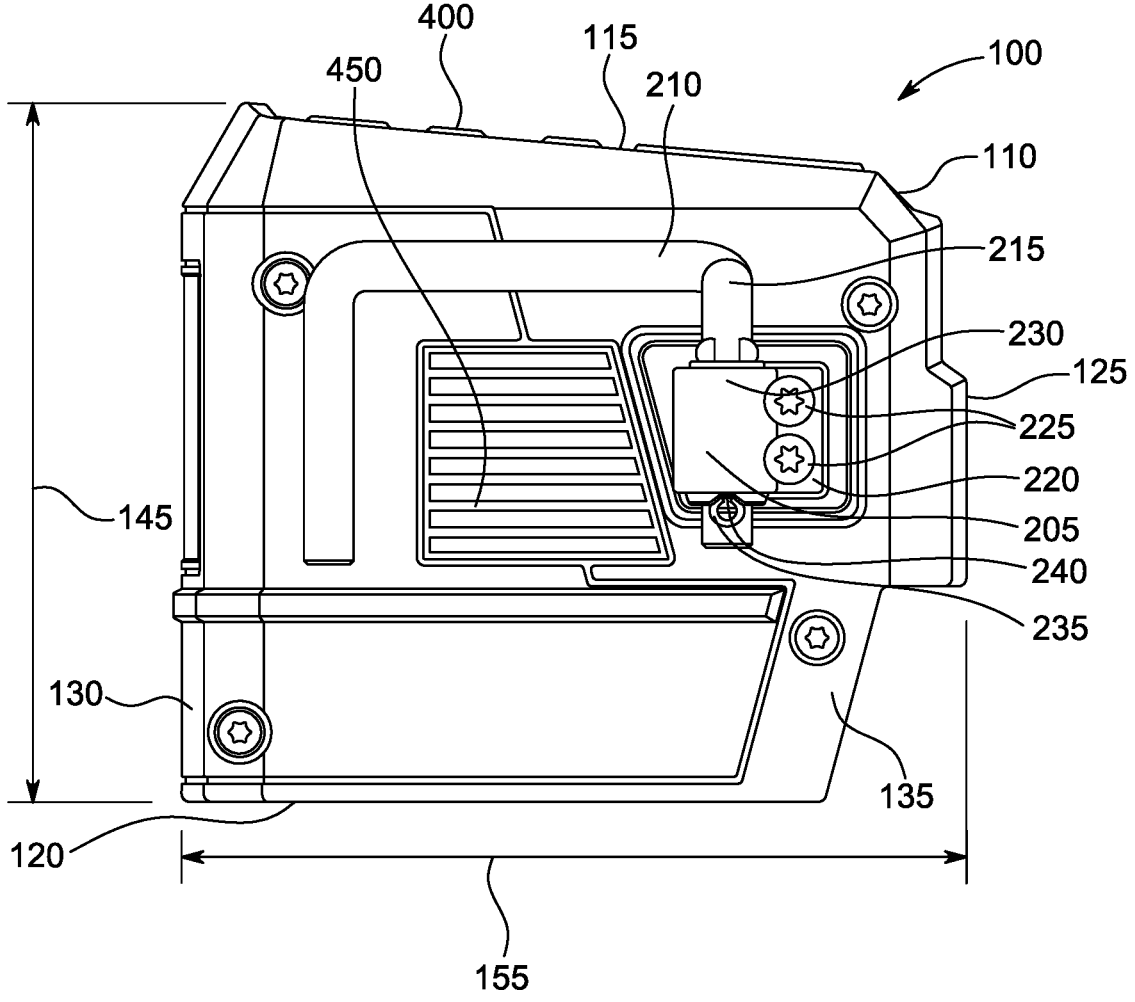
FIG. 11 is a first side view of the single battery pack inverter of FIG. 8 in accordance with some embodiments.

The illustrated single battery pack inverter 100 includes a housing 110 having a top surface 115, a bottom surface 120, a front surface 125, a rear surface 130, and opposite side surfaces 135, 140. With reference to FIGS. 10 and 11, the illustrated single battery pack inverter 100 includes a height 145 within a range of approximately 65 mm to approximately 75 mm. In some embodiments, the height 145 is approximately 71.3 mm. The illustrated single battery pack inverter 100 includes a width 150 within a range of approximately 60 mm to approximately 80 mm. In some embodiments, the width 150 is approximately 74 mm. The illustrated single battery pack inverter 100 includes a depth 155 within a range of approximately 85 mm to approximately 95 mm. In some embodiments, the depth 155 is approximately 91.1 mm. In some embodiments, the weight of the single battery pack inverter 100, without the battery pack 105, is less than 1 lb. In some embodiments, the weight of the single battery pack inverter 100 is within a range of approximately 0.5 lbs to approximately 1 lb. In some embodiments, the weight of the single battery pack inverter 100 is approximately 0.62 lbs. As shown in FIG. 6, the battery pack 105 includes a fuel gauge 160 that indicates a charge level of the battery pack 105. The single battery pack inverter 100 is sized such that the fuel gauge 160 is always visible to the user. For example, the depth 155 of the single battery pack inverter 100 is sized to be less than the depth of the battery pack 105.

Figure 15:
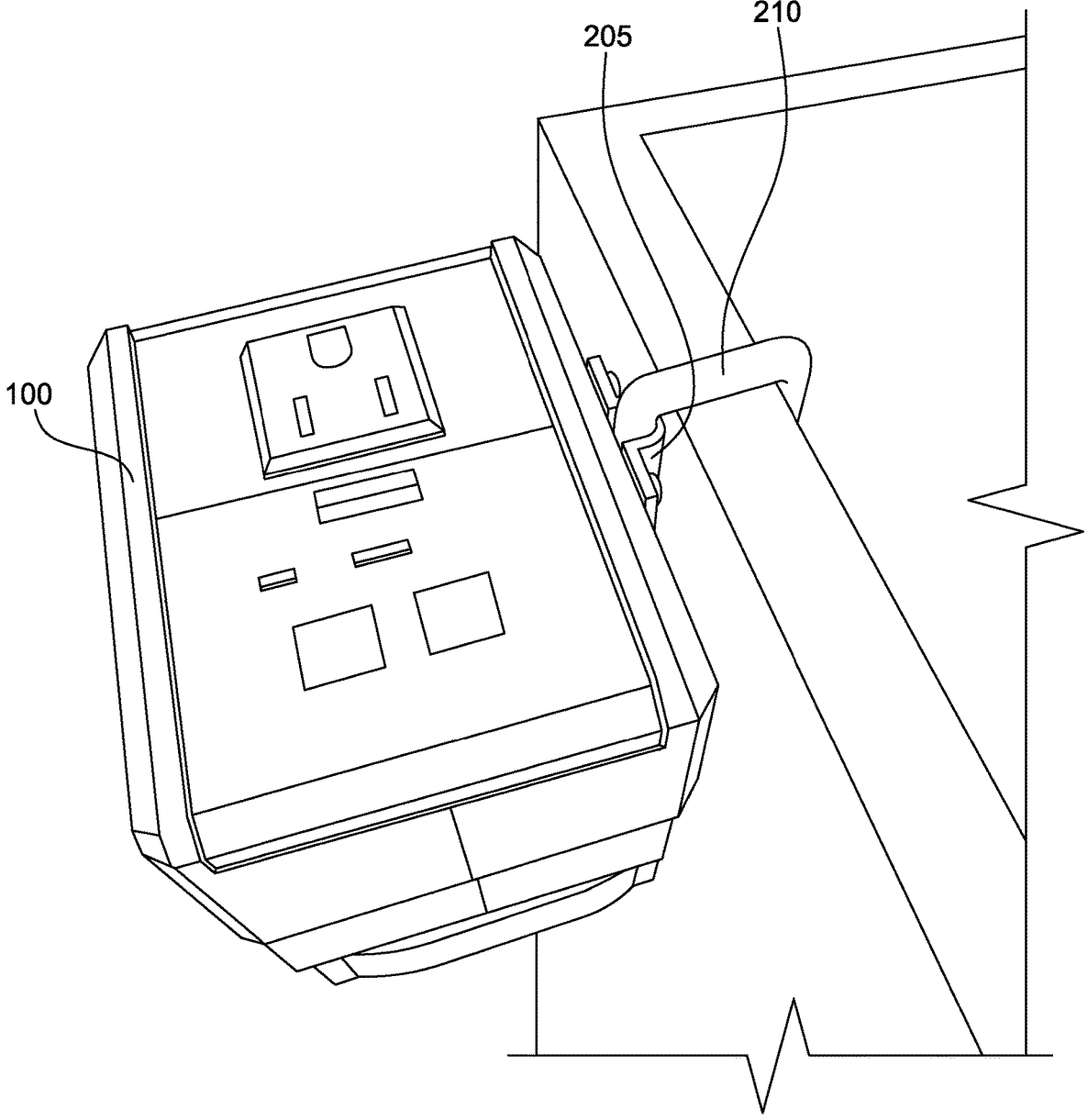
FIG. 15 is a perspective view of the single battery pack inverter of FIG. 1 in accordance with some embodiments.

A hanging hook 200 is fixed on a side surface 135 using a fastening member 205. Referring to FIGS. 11 and 15, the hanging hook 200 includes an L-shaped hanging portion 210 and a pivoting portion 215. The fastening member 205 includes a flat portion 220 which is fastened to the side surface 135 using fasteners 225. The fastening member 205 also includes a hook receiving portion 230 having an opening to receive the pivoting portion 215 of the hanging hook 200. The hanging hook 200 pivots about the pivoting portion 215 and the hook receiving portion 230.

The hanging hook 200 is pivoted between a first position (shown in FIG. 11) and a second position (shown in FIG. 15). When in the first position, the hanging hook 200 rests on the side surface 135 such that the hanging portion 210 is approximately parallel to the side surface 135 for easy storage of the single battery pack inverter 100. When in the second position, the hanging portion 210 extends perpendicular to the side surface 135. In the second position the hanging portion 210 can be placed on, for example, beams, racks, metal bars, wooden bars (2×4s), dollies, and the like that are present at a worksite. Flat surfaces for placement of the single battery pack inverter 100 may be scarce at a worksite. As a consequence, the hanging hook 200 is used to hang the single battery pack inverter 100 from equipment, dollies, and other features available at a worksite. The hanging hook 200 has a depth of about 1 inch such that the single battery pack inverter 100 can be hung from any feature having a 1 inch depth or less.

Figure 16:
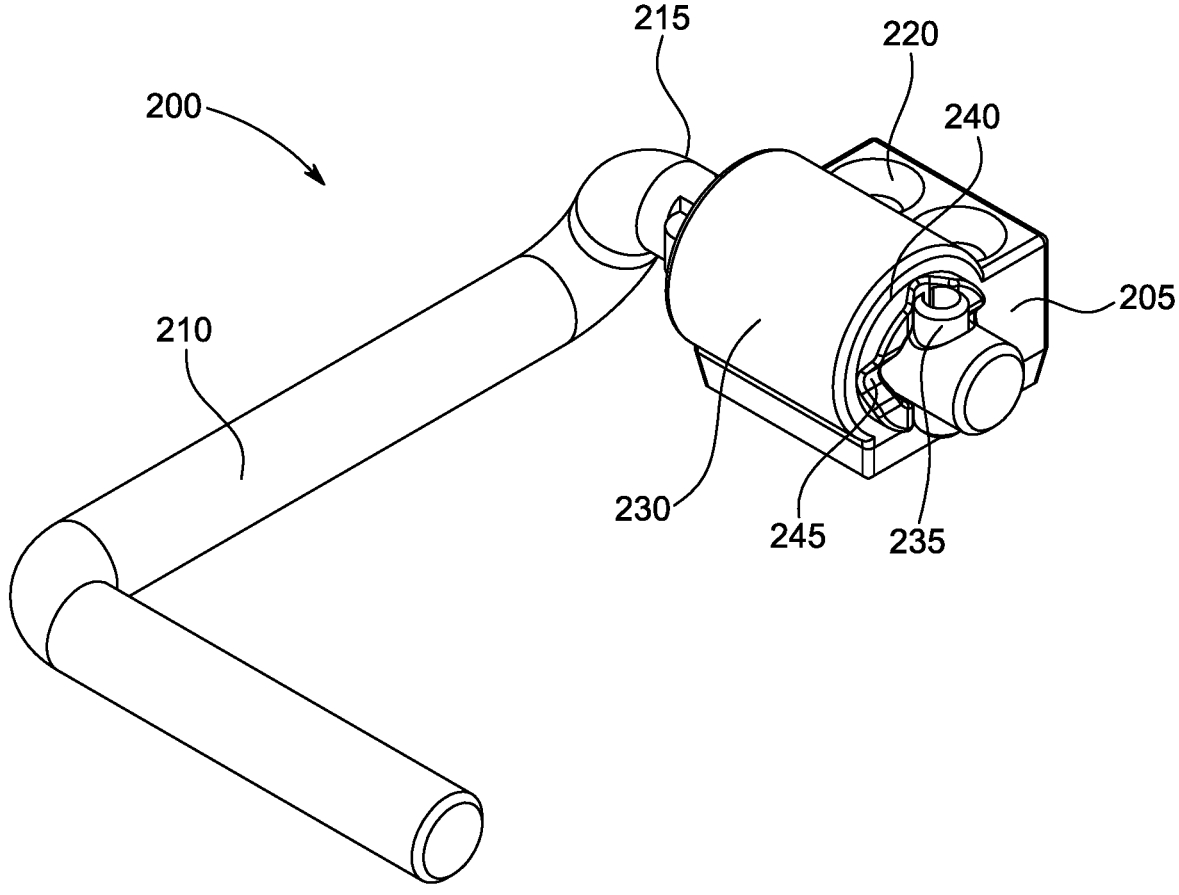
FIG. 16 is a perspective view of a hanging hook of the single battery pack inverter of FIG. 1 in accordance with some embodiments.

The hanging portion 210 extends from the pivoting portion 215 on a first side of the hook receiving portion 230. Referring to FIG. 16, a blocking bar 235 extends from the pivoting portion 215 on a second side of the hook receiving portion 230 to reduce axial movement of the hanging hook 200. The blocking bar 235 extends in a direction perpendicular to the axial direction of the pivoting portion 215. The hook receiving portion 230 includes a first pair of grooves 240 and a second pair of grooves 245 on the second side of the hook receiving portion 230. The blocking bar 235 rests in the first pair of grooves 240 when the hanging portion 210 is pivoted to the first position. The blocking bar 235 rests in the second pair of grooves 245 when the hanging portion 210 is pivoted to the second position. In some embodiments, a spring is provided in the hook receiving portion 230 to move the pivoting portion 215 axially such that the blocking bar 235 can be moved between the first pair of grooves 240 and the second pair of grooves 245. A similar implement as the blocking bar 235 may be provided on pivoting portion 215 on the first side of the hook receiving portion 230 to limit the axial movement of the pivoting portion 215 in the hook receiving portion 230.

Figure 28:
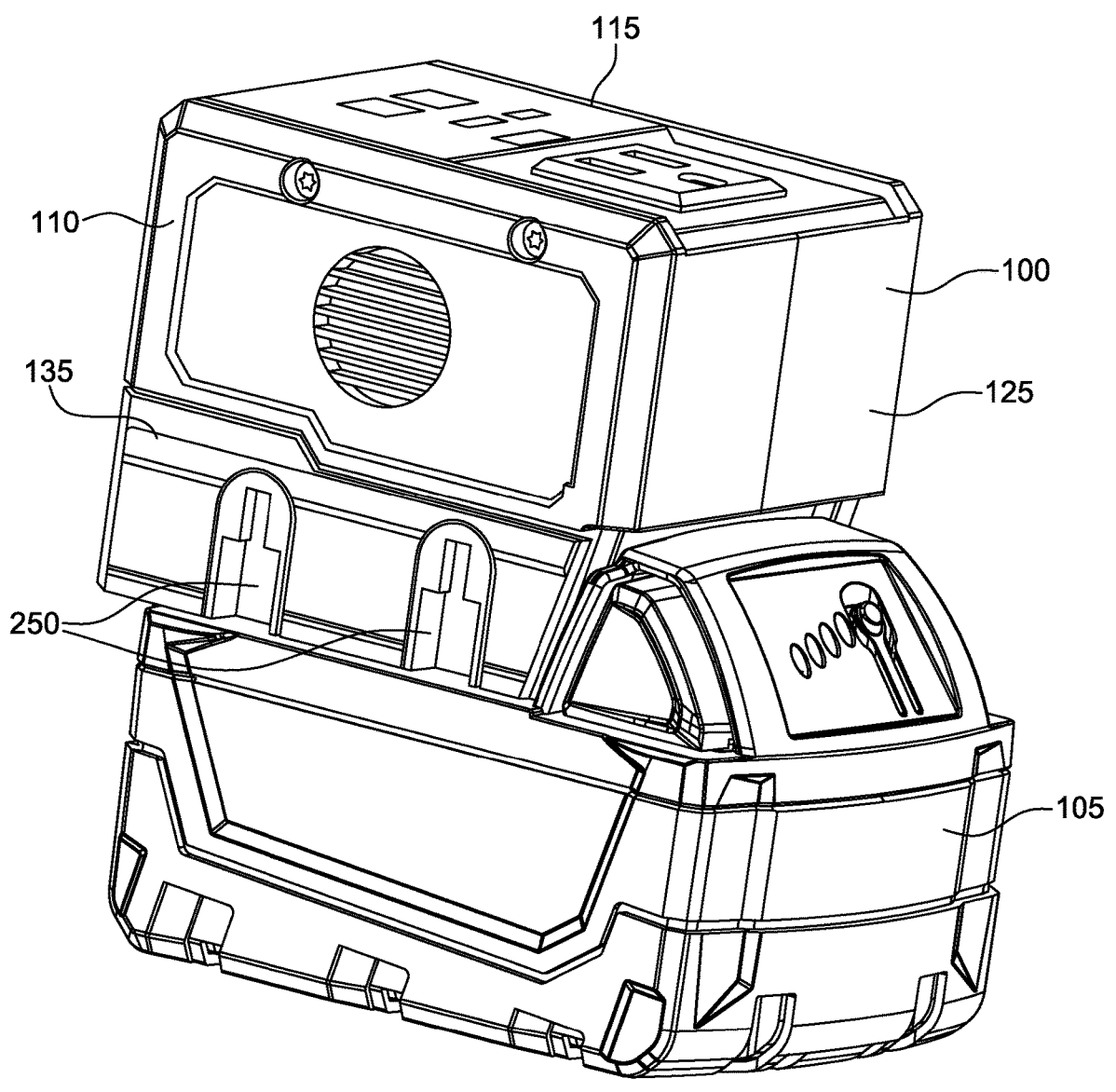
FIG. 28 illustrates a single battery pack inverter in accordance with some embodiments.

Referring to FIG. 28, in some embodiments, key holes 250 are provided in addition to or in place of the hanging hook 200. The key holes 250 are used to hang the single battery pack inverter 100 on hanging fasteners provided on walls or other equipment at a worksite. In some embodiments, other hanging features, for example, tether clips, carabiners, and the like are also used.

Referring to FIGS. 8-14, a battery pack interface 300 is provided for the battery pack 105. In the illustrated construction, the battery pack interface 300 is provided on the bottom surface 120 (e.g., a first surface) of the housing 110. The battery pack interface 300 includes stepped grooves 305 and a terminal block 310. The stepped grooves 305 allow for the battery pack 105 to be slidably received in the battery pack interface 300. The terminal block 310 is supported on the battery pack interface 300 to mechanically and electrically interface with a corresponding terminal block of the battery pack 105 to transfer electrical power therebetween.

The battery pack 105 includes an actuator mechanism 315 including two actuators 320 provided on each side of the battery pack 105. To attach the battery pack 105 to the single battery pack inverter 100, the grooves of the battery pack 105 are lined up with the stepped grooves 305 at the front surface 125, and the battery pack 105 is pushed to the rear surface 130 towards the terminal block 310. The actuator mechanism 315 locks onto the battery pack interface 300 to prevent the battery pack 105 from sliding-off the single battery pack inverter 100. To remove the battery pack 105 from the single battery pack inverter 100, the actuators 320 are depressed to release the lock and the battery pack 105 is pulled towards the front surface 125.

The battery pack 105 is, for example, a M18™ RED-LITHIUM™ Battery Pack marketed and sold by Milwaukee©. The battery pack 105 may be used to power several power tools and devices of a power tool system. For example, the battery pack 105 may be used to power any device in the M18™ power tool system marketed and sold by Milwaukee©.

Figure 13:
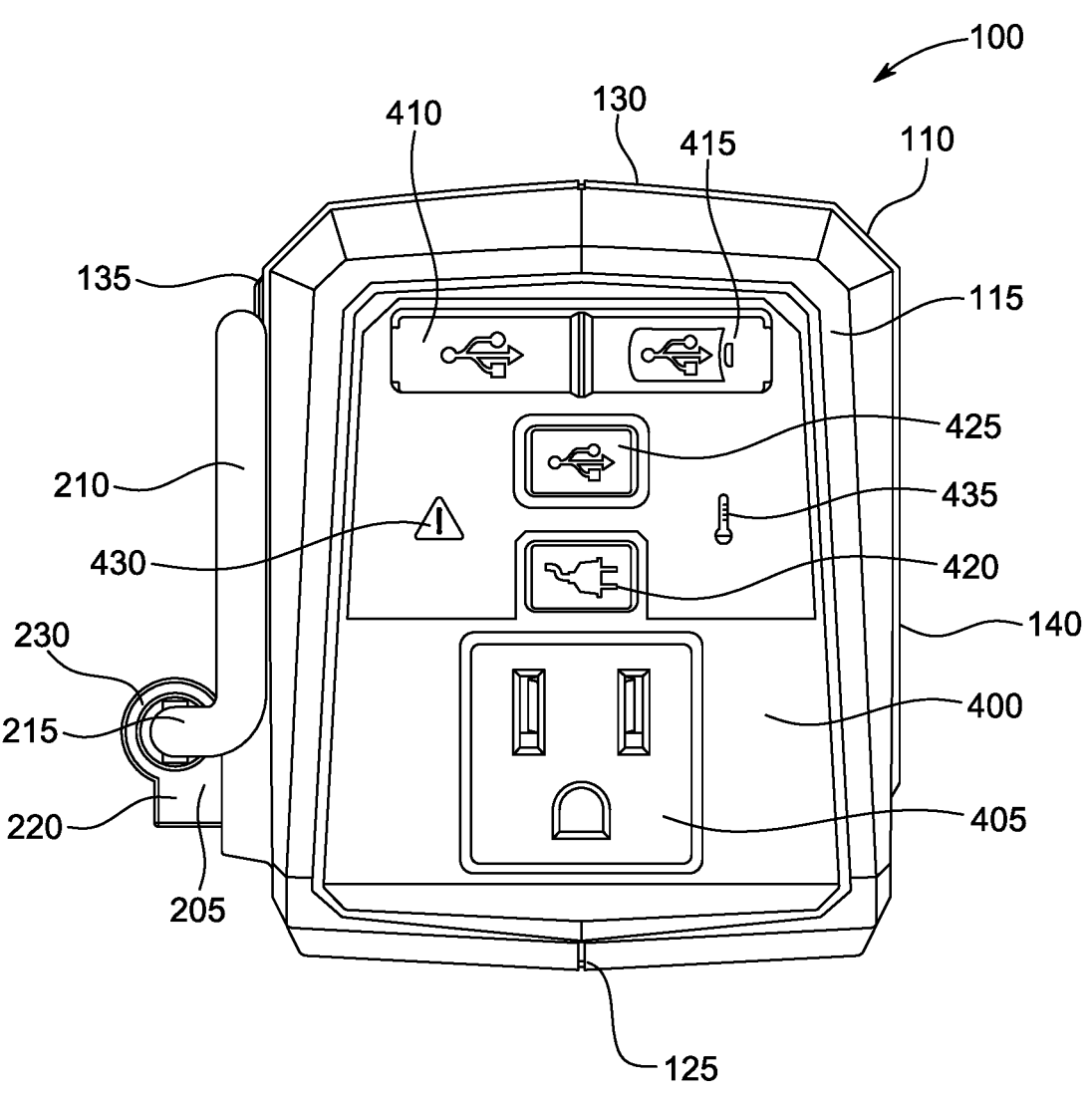
FIG. 13 is a top view of the single battery pack inverter of FIG. 8 in accordance with some embodiments.
Figure 14:
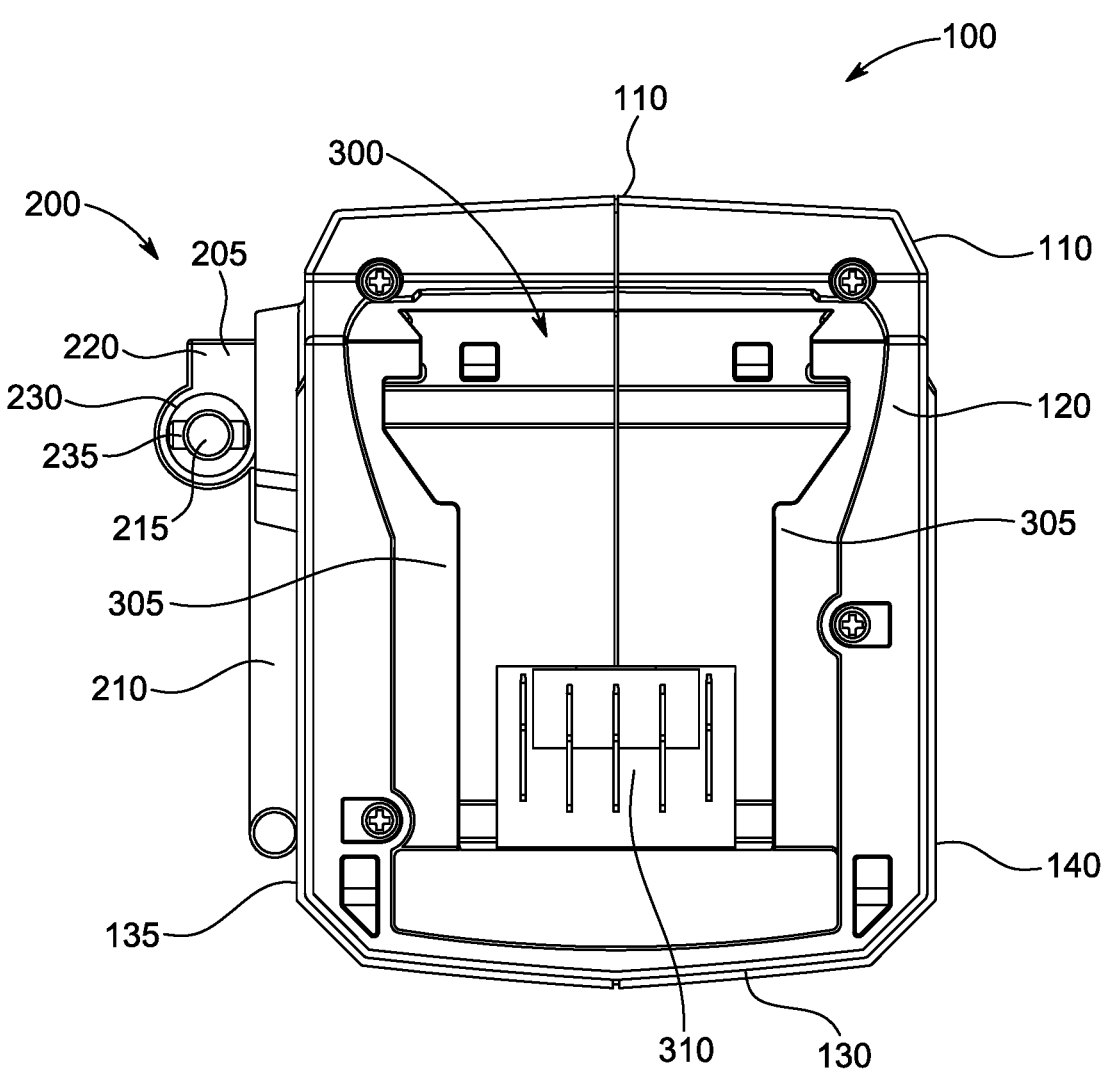
FIG. 14 is a bottom view of the single battery pack inverter of FIG. 8 in accordance with some embodiments.

FIGS. 6 and 13 illustrate a user interface 400 provided on the top surface 115 (e.g., a second surface) of the housing 110. In the illustrated example, the user interface 400 includes an AC outlet 405, a first DC outlet 410, a second DC outlet 415, an AC output enable button 420, a DC output enable button 425, an overload indicator 430, and an over-temperature indicator 435. The illustrated indicators include visual indicators and, in other constructions, may include other types of indicators, such as audible, tactile, and the like.

The AC outlet 405 is, for example, a 120 V AC outlet that provides a similar power output as a wall outlet. In some embodiments, the AC outlet 405 is a 240 V AC outlet. The first DC outlet 410 is, for example, a USB type-C outlet and the second DC outlet 415 is, for example, a USB type-A outlet. The AC outlet 405, the first DC outlet 410, and the second DC outlet 415 are powered by the battery pack 105.

The AC output enable button 420 and the DC output enable button 425 may be implemented as a pushbutton, a two-way switch, a touch-button, and the like. The AC output enable button 420 is used to enable and disable the AC outlet 405. The DC output enable button 425 is used to enable and disable the first DC outlet 410 and the second DC outlet 415. In the example illustrated, the AC output enable button 420 and the DC output enable button 425 are back-lit push buttons. The AC output enable button 420 is pushed to toggle between enabling and disabling output power from the AC outlet 405. The AC output enable button 420 is illuminated (or illuminated in a first color) when the AC outlet 405 is enabled and the AC output enable button 420 is not illuminated (or illuminated in a second color) when the AC outlet 405 is disabled. The DC output enable button 425 is pushed to toggle between enabling and disabling output power from the first DC outlet 410 and the second DC outlet 415. The DC output enable button 425 is illuminated (or illuminated in a first color) when the first DC outlet 410 and the second DC outlet 415 are enabled and the DC output enable button 425 is not illuminated (or illuminated in a second color) when the first DC outlet 410 and the second DC outlet 415 are disabled. In some embodiments, all three outputs (i.e., the AC outlet 405 and the DC outlets 410, 415) can operate at the same time. For example, the user may enable both the AC outlet 405 and the DC outlet 410, 415 at the same time using the AC output enable button 420 and the DC output enable button 425.

The overload indicator 430 is a back-lit indicator including an overload label placed on the overload indicator 430. The overload indicator 430 is illuminated when a load output of the single battery pack inverter 100 exceeds a predetermined load threshold. The over-temperature indicator 435 is a back-lit indicator including a temperature label placed on the over-temperature indicator 435. The over-temperature indicator 435 is illuminated when a temperature of the single battery pack inverter 100 exceeds a predetermined temperature threshold.

As shown in FIGS. 1-14, the user interface 400 is provided on an opposite surface (or face) of the single battery pack inverter 100 as the battery pack interface 300. That is, the battery pack interface 300 is provided on the first surface (i.e., the bottom surface 120) and the user interface 400 is provided on the second surface (i.e., the top surface 115). As shown in FIGS. 6 and 13, the AC outlet 405 and the DC outlets 410, 415 are provided on the same surface (i.e., the top surface 115) that is opposite the surface (i.e., the bottom surface 120) on which the battery pack interface 300 is provided.

Figure 12:
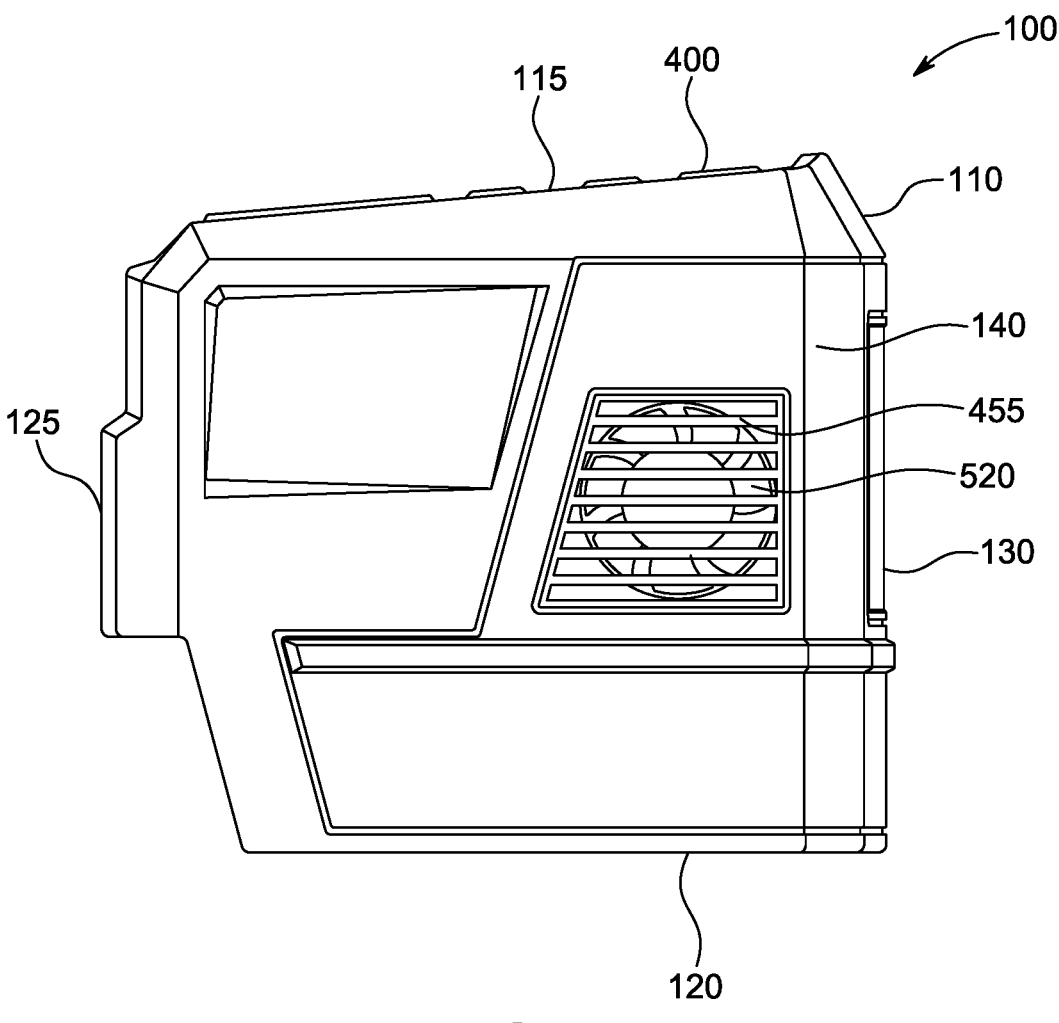
FIG. 12 is a second side view of the single battery pack inverter of FIG. 8 in accordance with some embodiments.

With reference to FIGS. 11 and 12, first air vents 450 and second air vents 455 are provided on the opposite side surfaces 135, 140 of the housing 110, respectively. The first air vents 450 and the second air vents 455 allow for cooling air to circulate within the housing 110 to cool components (e.g., the electronics) of the single battery pack inverter 100.

Figure 17:
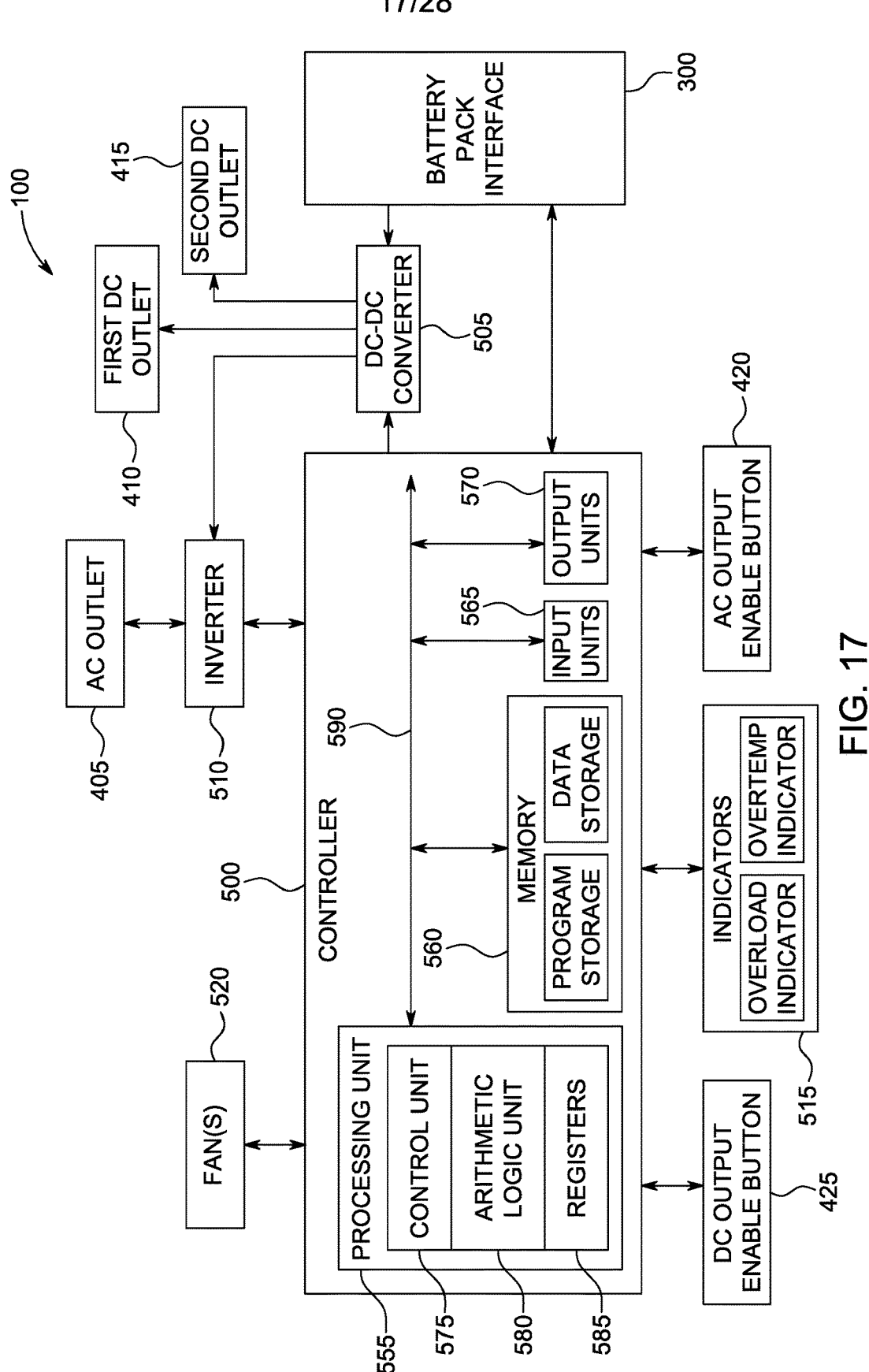
FIG. 17 is a simplified block diagram of the single battery pack inverter of FIG. 1 in accordance with some embodiments.

FIG. 17 is a simplified block diagram of the single battery pack inverter 100. In the example illustrated, the single battery pack inverter 100 includes the battery pack interface 300, the AC outlet 405, the first DC outlet 410, the second DC outlet 415, the AC output enable button 420, the DC output enable button 425, a controller 500, a DC-DC converter 505, an inverter 510, indicators 515, and one or more fans 520.

The controller 500 includes a plurality of electrical and electronic components that provide power, operational control, and protection to the components and modules within the controller 500 and/or the single battery pack inverter 100. For example, the controller 500 includes, among other things, a processing unit 555 (e.g., a microprocessor, a microcontroller, an electronic processor, an electronic controller, or another suitable programmable device), a memory 560, input units 565, and output units 570. The processing unit 555 includes, among other things, a control unit 575, an ALU 580, and a plurality of registers 585 (shown as a group of registers in FIG. 17), and is implemented using a known computer architecture (e.g., a modified Harvard architecture, a von Neumann architecture, etc.). The processing unit 555, the memory 560, the input units 565, and the output units 570, as well as the various modules or circuits connected to the controller 500 are connected by one or more control and/or data buses (e.g., common bus 590). The control and/or data buses are shown generally in FIG. 17 for illustrative purposes. The use of one or more control and/or data buses for the interconnection between and communication among the various modules, circuits, and components would be known to a person skilled in the art in view of the embodiments described herein. In some embodiments, the controller 500 is implemented partially or entirely on a field-programmable gate array (FPGA), an application specific integrated circuit (ASIC), or the like.

The memory 560 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 555 is connected to the memory 560 and executes software instructions that are capable of being stored in a RAM of the memory 560 (e.g., during execution), a ROM of the memory 560 (e.g., on a generally permanent basis), or another non-transitory computer readable medium such as another memory or a disc. Software included in the implementation of the single battery pack inverter 100 can be stored in the memory 560 of the controller 500. The software includes, for example, firmware, one or more applications, program data, filters, rules, one or more program modules, and other executable instructions. The controller 500 is configured to retrieve from the memory 560 and execute, among other things, instructions related to the control processes and methods described herein. In other constructions, the controller 500 includes additional, fewer, or different components.

The DC-DC converter 505 receives DC power supply from the battery pack 105 and provides high-voltage DC power (e.g., 120 V) to the inverter 510 and low-voltage DC power (e.g., 5 V) to the first DC outlet 410 and the second DC outlet 415. The DC-DC converter 505 includes a step-up converter (e.g., boost converter) to convert battery pack voltage to high-voltage DC power (e.g., 18 V to 120 V) and a step-down converter (e.g., buck converter) to convert battery pack voltage to low-voltage DC power (e.g., 18 V to 5 V). In some embodiments, the step-up converter and the step-down converter of the DC-DC converter 505 are provided separately on different printed circuit boards. In some embodiments, the step-up converter may be provided with the inverter 510, while the DC-DC converter 505 only includes the step-down converter.

The inverter 510 receives the high-voltage DC power from the DC-DC converter 505 and converts the high-voltage DC power to an AC output (e.g., 120 VAC power output). The AC output is then provided to the AC outlet

405. The inverter 510 may be controlled by the controller 500, for example, based on the AC output enable button 420. The controller 500 provides enable/disable signals to the inverter 510 to enable or disable the inverter 510 from providing AC output to the AC outlet 405. The inverter 510 provides additional feedback to the controller 500. For example, the inverter 510 provides an over-temperature signal when the temperature of the inverter 510 exceeds a predetermined temperature threshold, an overload feedback signal when the load on the AC outlet 405 exceeds a predetermined load threshold, and provides a current sensor feedback indicating the amount of output current flowing to the AC outlet 405. In some embodiments, when a high-powered AC device is plugged in to the AC outlet 405, the inverter 510 provides an overload indication to the controller 500. The controller 500 shuts down the single battery pack inverter 100 in response to the overload indication and illuminates the overload indicator 430. The user may reset the single battery pack inverter 100 by doing a power cycle. For example, the user resets the single battery pack inverter 100 by pressing the AC output enable button 420 twice.

The inverter 510 is, for example, a field effect transistor (FET) switching bridge. In some embodiments, the inverter 510 is implemented as an H-bridge or a three-phase switch bridge. For example, the inverter 510 includes a plurality of high-side FETs and a plurality of low-side FETs that are controlled by the controller 500. Specifically, the controller 500 uses a drive circuit to provide pulse-width-modulated (PWM) control signals to open and close the plurality of high-side FETs and the plurality of low-side FETs to convert DC power to AC power. In some embodiments, the controller 500 controls the inverter 510 to provide a pure sine wave output, a modified sine wave output, and the like to the AC outlet 405.

When both the AC outlet 405 and the DC outlets 410, 415 are enabled for concurrent operation, the controller 500 controls the DC-DC converter 505 and the inverter 510 to provide output power at both the AC outlet 405 and the DC outlets 410, 415.

The controller 500 controls the indicators 515 (e.g., visual, audible, tactile, etc.) based on the status of the single battery pack inverter 100. The indicators 515 include visual indicators (e.g., the overload indicator 430 and the over-temperature indicator 435), and an audible indicator (e.g., a buzzer). In other embodiments, the indicators 515 may include more or fewer status indicators 515 than those illustrated in FIG. 17. The controller 500 activates or deactivates the over-temperature indicator 435 based on the temperature signals received from the battery pack 105 and the inverter 510. The controller 500 activates or deactivates the overload indicator 430 based on the overload feedback received from the inverter 510.

In some embodiments, the buzzer provides an audible indication to a user based on control signals received from the controller 500. The buzzer may provide an audible indication for various threshold conditions of the single battery pack inverter 100. The threshold conditions may include a low voltage condition (the battery pack 105 is below a low-voltage threshold [e.g., 12 V or less]), an overload condition (an overload threshold based on a power profile [e.g., a power output for a time period (e.g., 220 W for 7 seconds or more, 200 W for 3.5 seconds or more, etc.)]), a temperature condition (a temperature of the single battery pack inverter 100 or its components [e.g., 110° C.]). In other embodiments, the single battery pack inverter 100 includes additional visual, audible, tactile, or other indicators to provide the low voltage, overload, and over temperature indications as described above with respect to the audible buzzer.

The controller 500 controls rotation of the fans 520 to control the air flow through the single battery pack inverter 100. In some embodiments, the controller 500 controls the speed of the fan 520 based on the temperature of the single battery pack inverter 100. In other embodiments, the controller 500 turns on the fan 520 when the temperature is above a threshold and turns off the fan 520 when the temperature is below the threshold.

Figure 18:
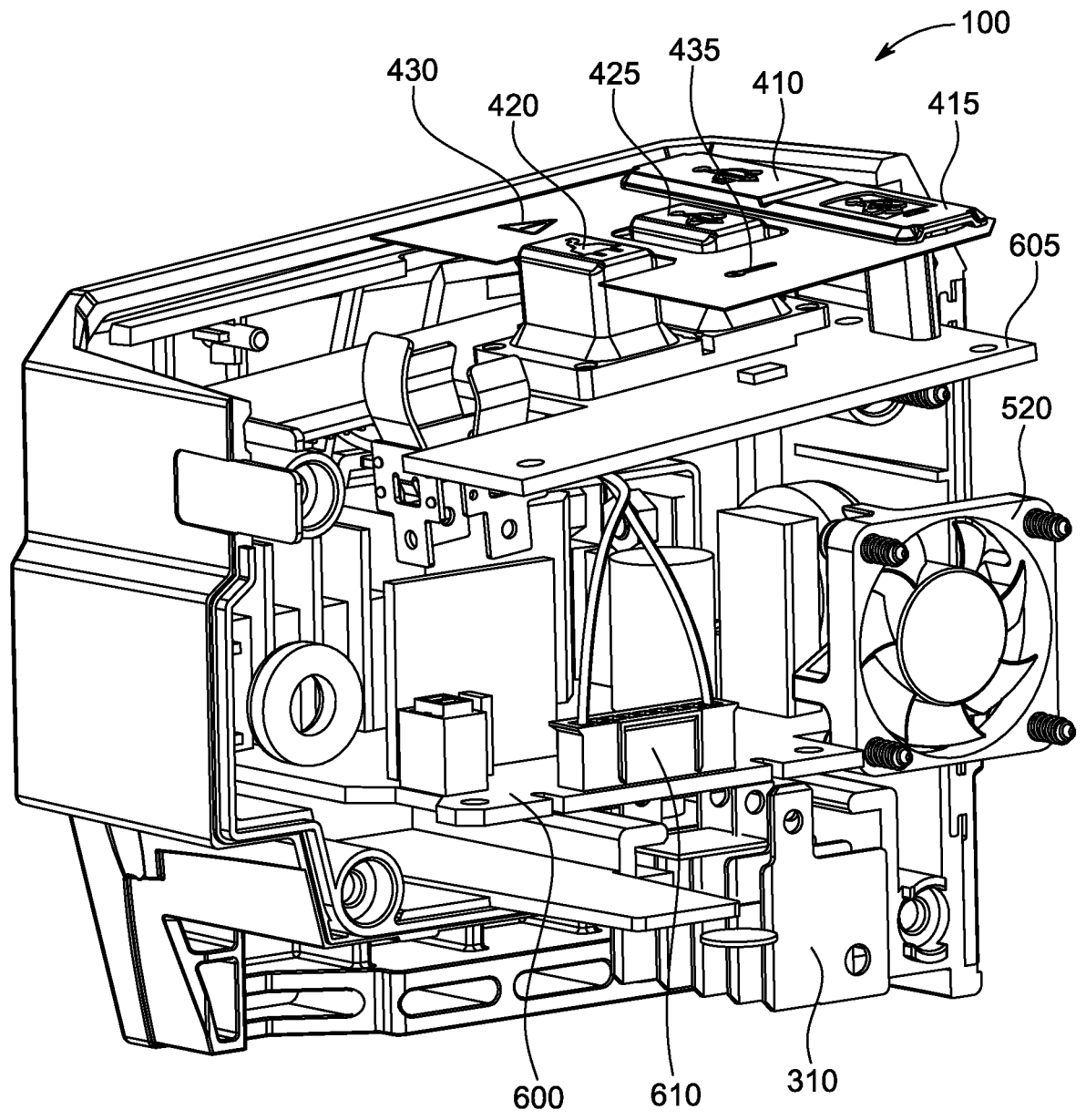
FIG. 18 is a perspective view of the single battery pack inverter of FIG. 8 with a portion of a housing removed in accordance with some embodiments.

FIG. 18 illustrates the single battery pack inverter 100 with a portion of the housing 110 removed. In the example illustrated, the single battery pack inverter 100 includes a first printed circuit board (PCB) 600, a second PCB 605, a PCB connector 610, the terminal block 310, and the fan 520. The electrical components of the single battery pack inverter 100 are distributed between the first PCB 600 and the second PCB 605. For example, the controller 500 and the inverter 510 are provided on the first PCB 600, while the DC-DC converter 505 is provided on the second PCB 605. The first PCB 600 is used to provide the output power to the AC outlet 405 and the second PCB 605 is used to power the USB outlets (i.e., the DC outlets 410, 415).

The first PCB 600 and the second PCB 605 are provided in a multi-level structure such that the first PCB 600 is provided on a first level and the second PCB 605 is provided is provided on a second level with a clearance distance between the first level and the second level for electrical components of the first PCB 600. The PCB connector 610 connects the first PCB 600 to the second PCB 605 to transfer control and power signals between the first PCB 600 and the second PCB 605. The terminal block 310 is provided below the first PCB 600 and is electrically connected to the first PCB 600 to provide operating power from the battery pack 105 to the inverter 510. In the illustrated embodiment, the fan 520 is provided between the first PCB 600 and the second PCB 605 along a side surface (for example, the side surface 135) of the housing 110.

Figure 19:
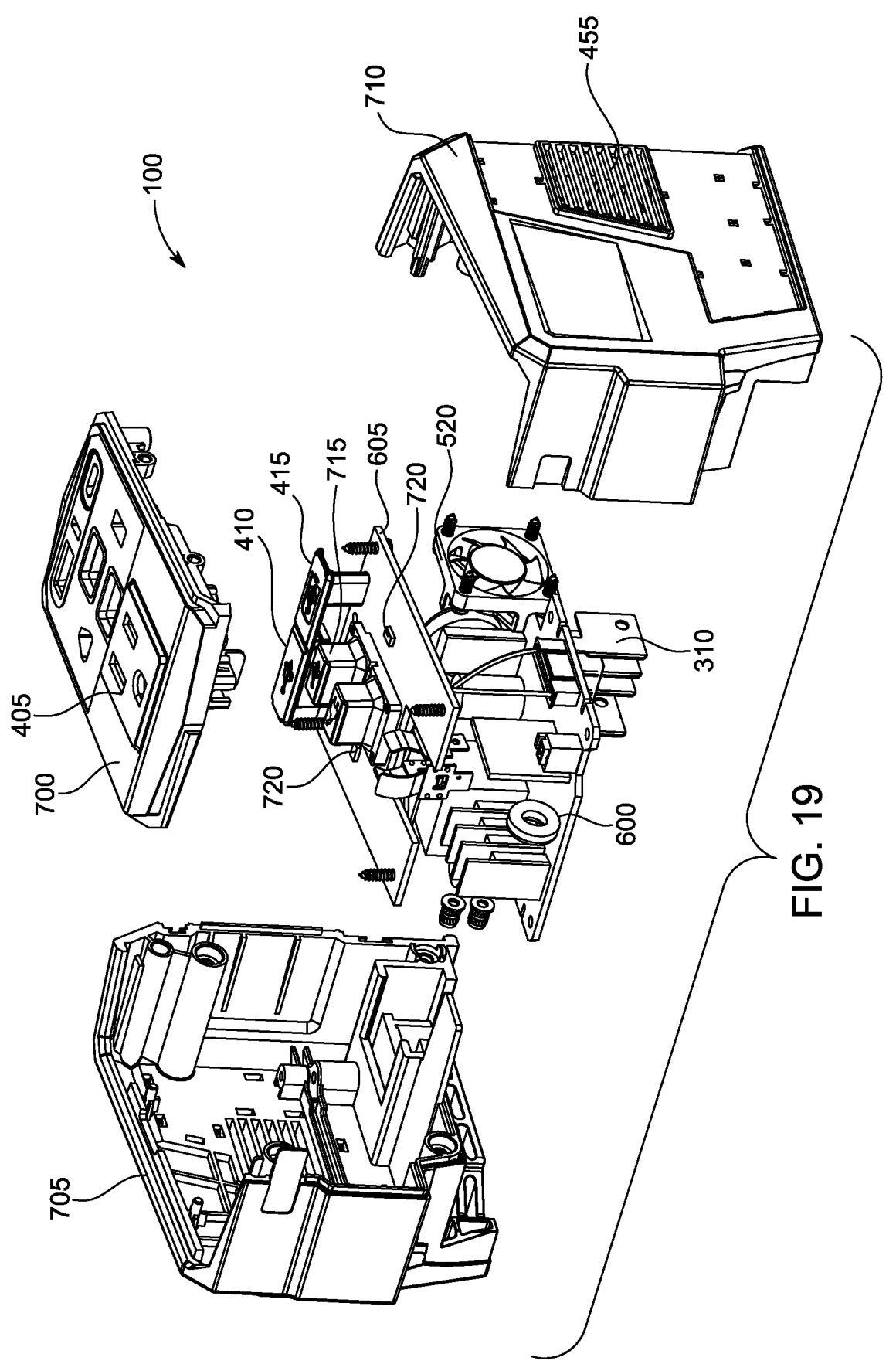
FIG. 19 is an exploded view of the single battery pack inverter of FIG. 8 in accordance with some embodiments.
Figure 20:
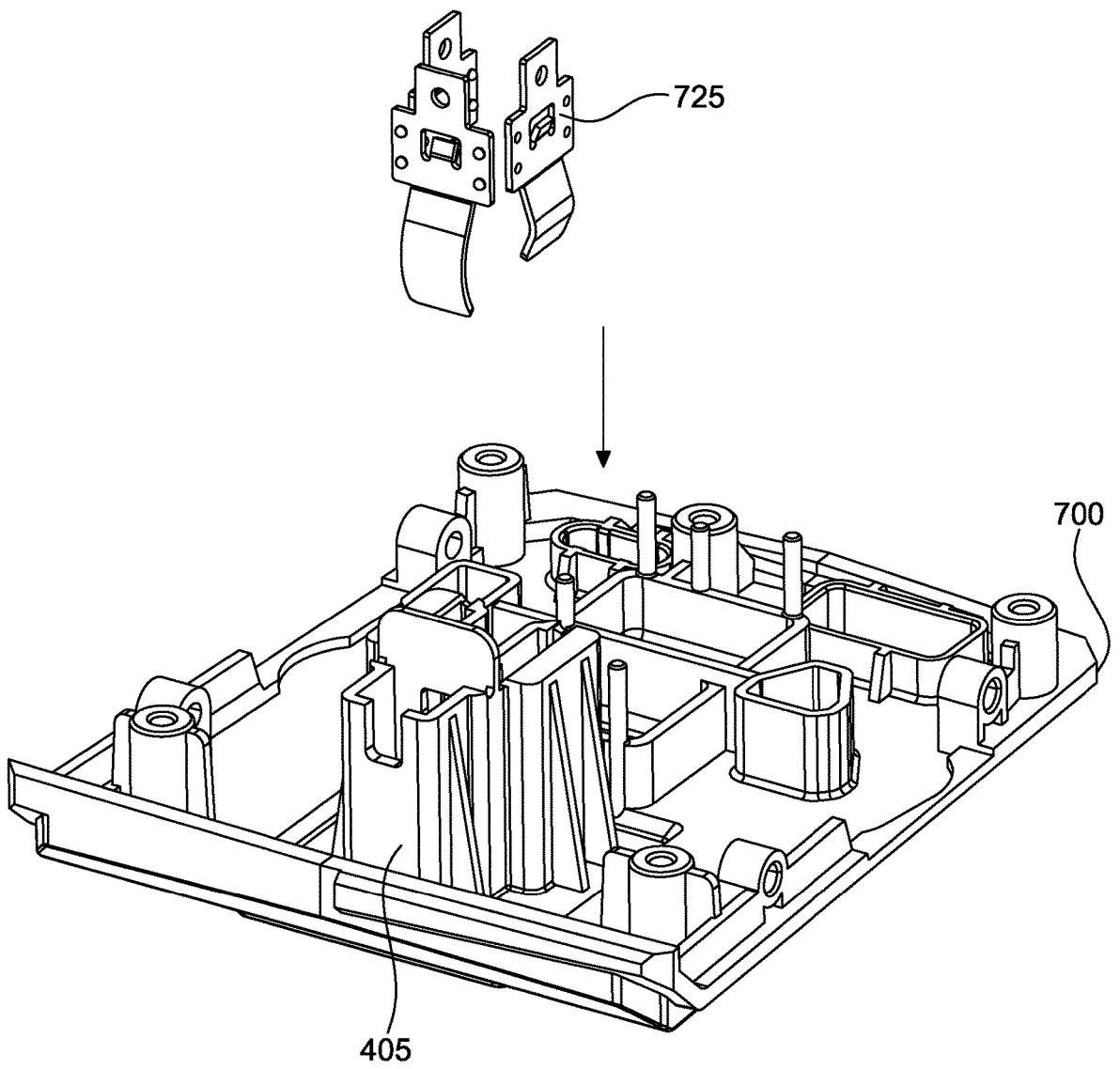
FIGS. 20-27 illustrate an assembly process of the single battery pack inverter of FIG. 1 in accordance with some embodiments.
Figure 21:
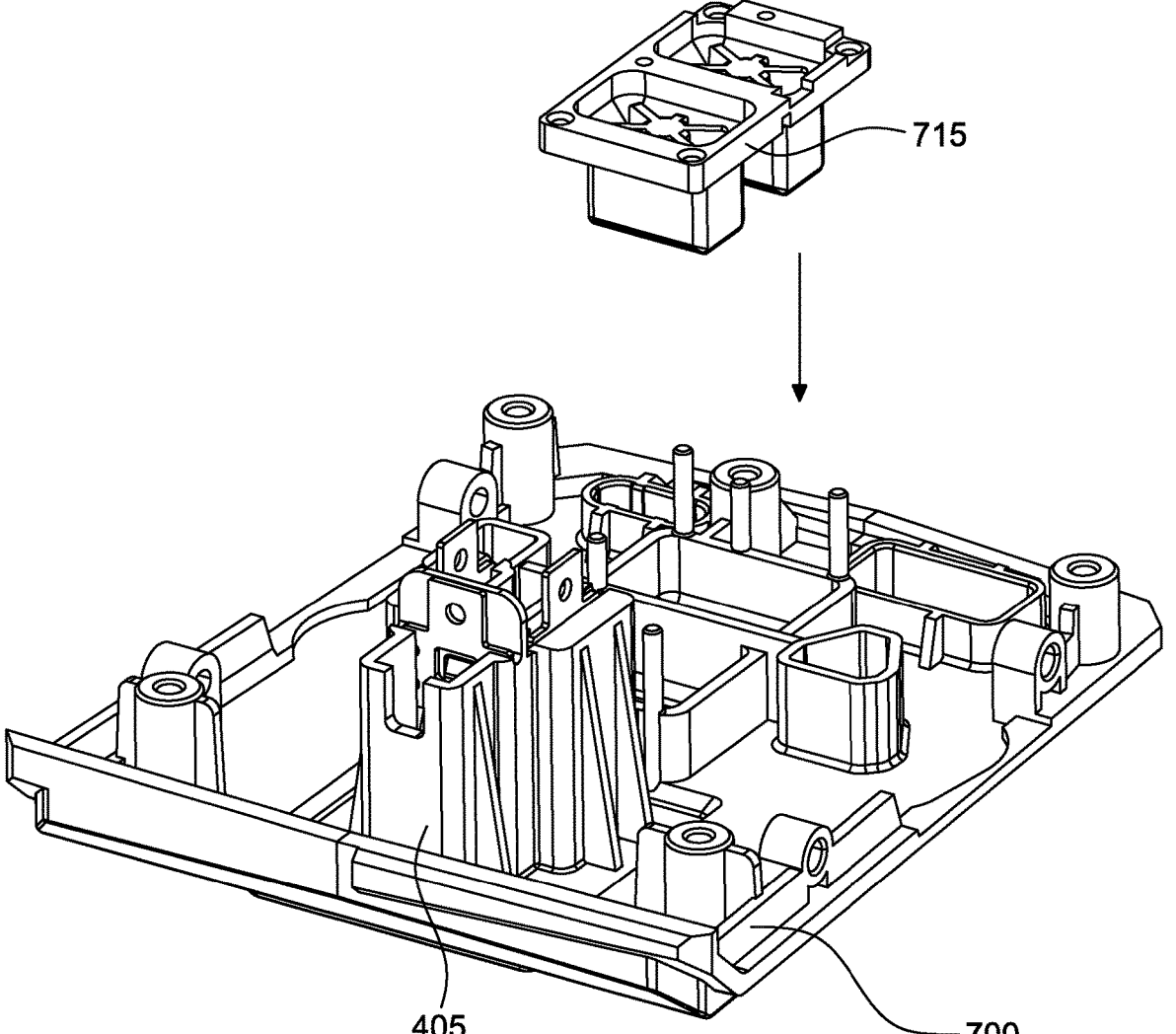
Figure 22:
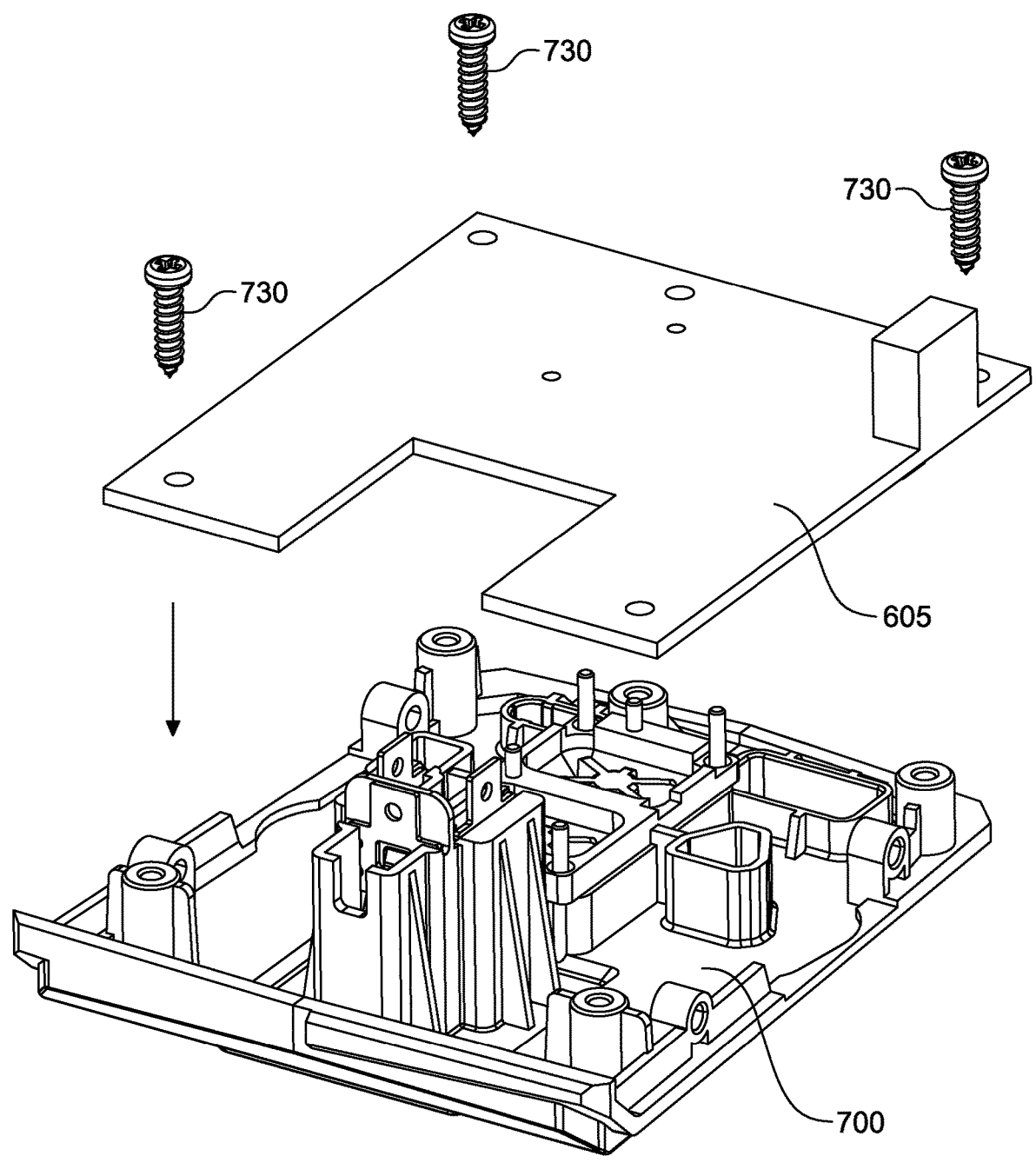
Figure 23:
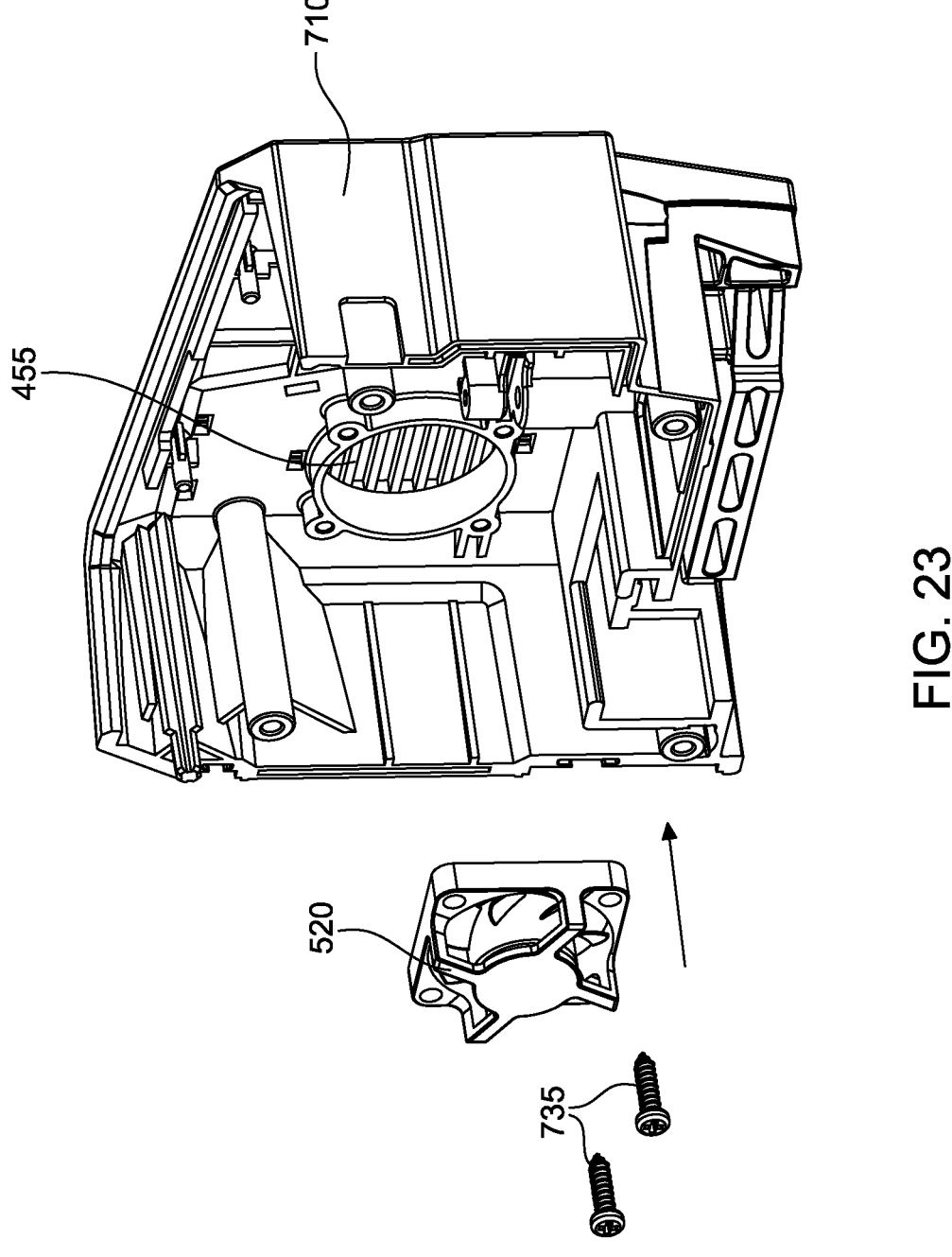
Figure 24:
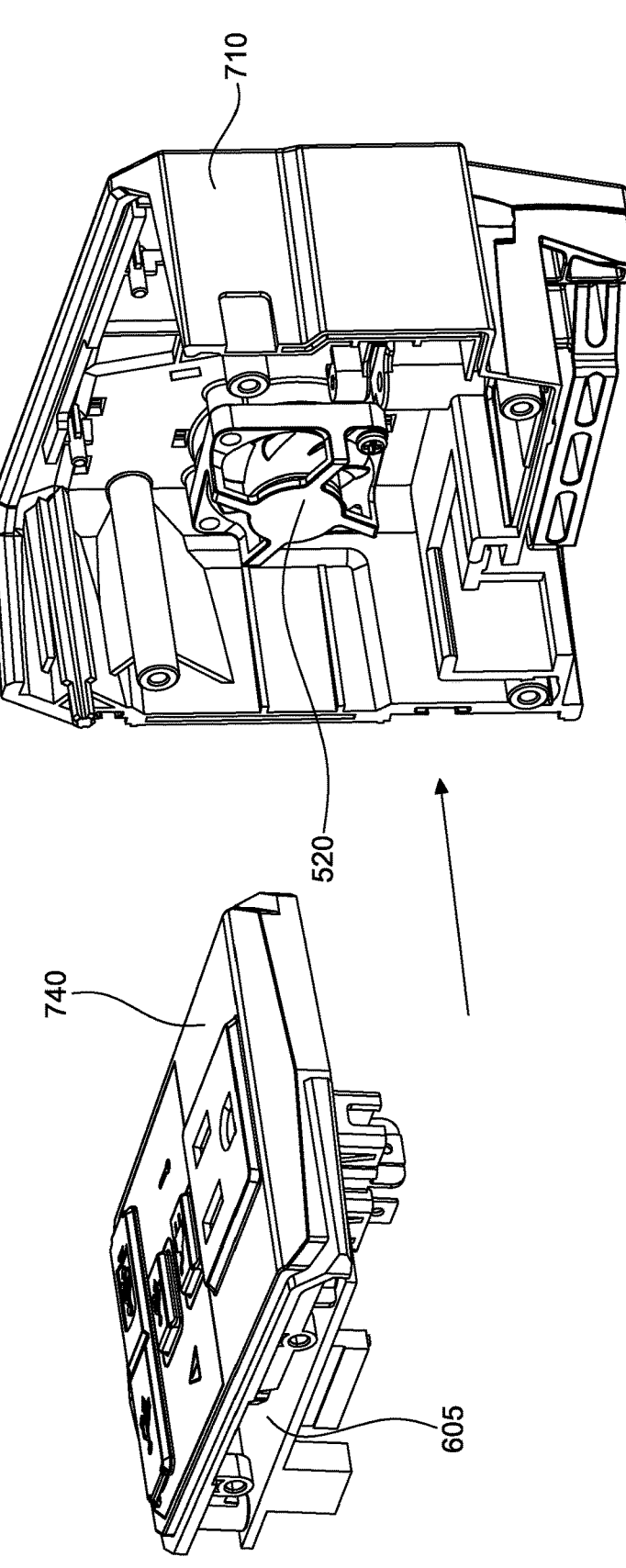
Figure 25:
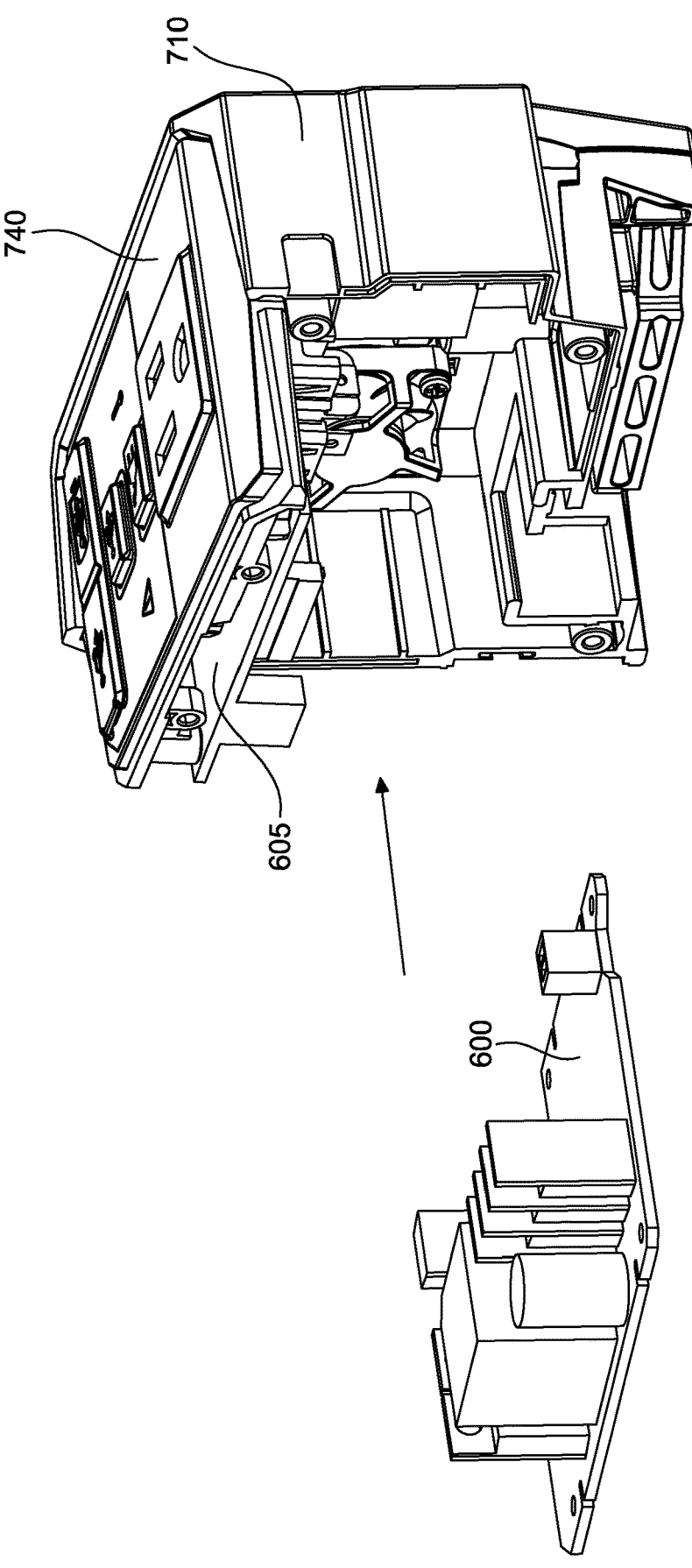
Figure 26:
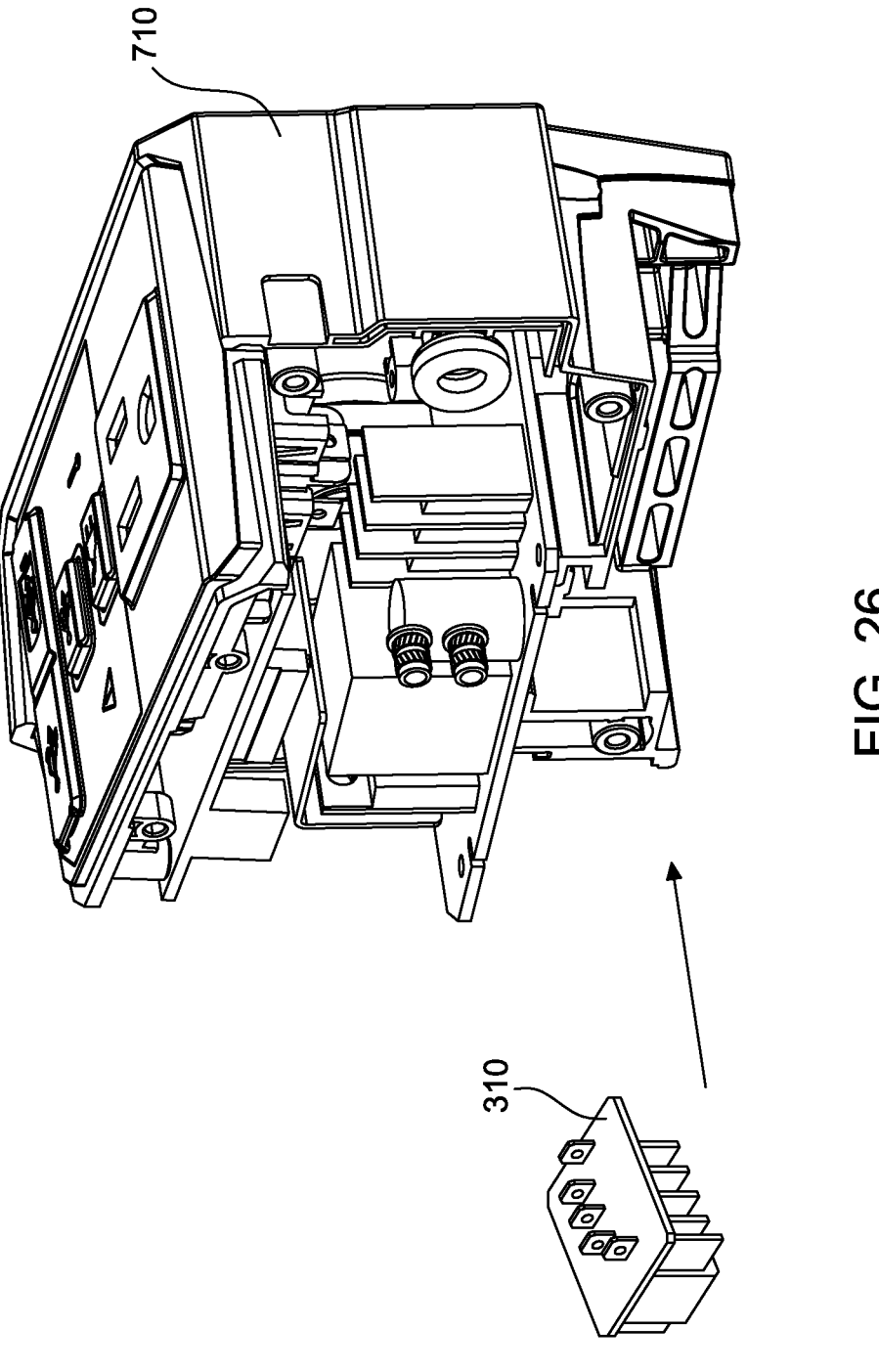
Figure 27:
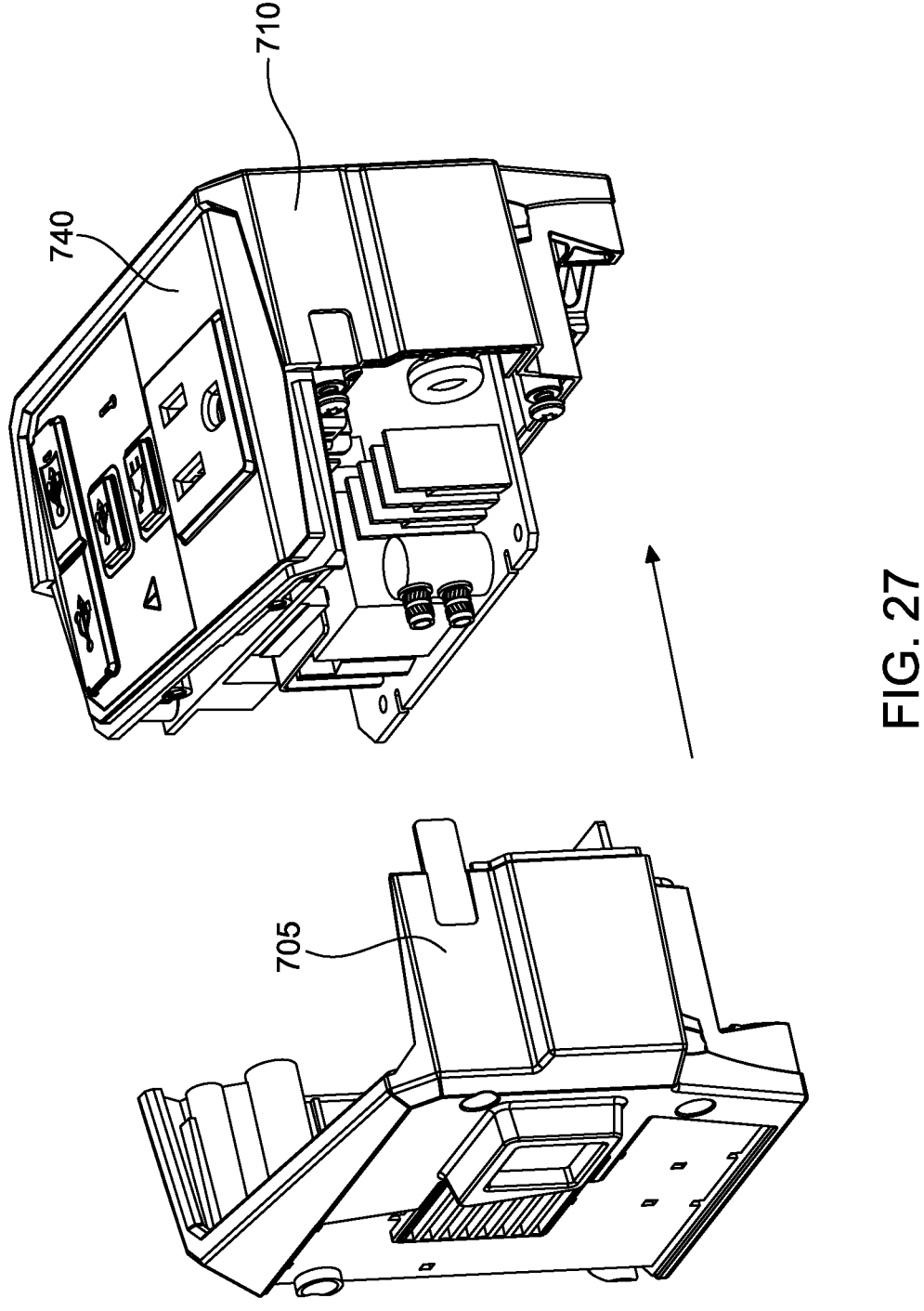

FIG. 19 illustrates an exploded view of the single battery pack inverter 100. The housing 110 is made of a top cover 700, a first half housing 705, and a second half housing 710. The first half housing 705 and the second half housing 710 form a clam shell housing with an opening at the top that is covered by the top cover 700. The top cover 700 includes openings to receive the features of the user interface 400. The top cover 700 includes the AC outlet 405, openings to receive the DC outlets 410, 415, openings to receive the enable buttons 420, 425, and the indicators 515. The enable buttons 420, 425 are provided on a button rubber 715 including light emitting diodes (LEDs) (not shown) provided below the button rubber 715 to illuminate the enable buttons 420, 425. Indicator LEDs 720 are provided below the indicators 515. Inserts 725 couple the inverter 510 on the first PCB 600 to the AC outlet 405 (see FIG. 20).

FIGS. 20 to 27 illustrate an assembly process of the single battery pack inverter 100. The assembly process begins with inserting the inserts 725 into the AC outlet 405 of the top cover 700 (shown in FIG. 20). The button rubber 715 and the LEDs 720 are then provided through respective openings (shown in FIG. 21). The second PCB 605 is then fixed to the top cover 700 using fasteners 730 (shown in FIG. 22). The fan 520 is fixed to the second air vents 455 of the second half housing 710 using fasteners 735 (shown in FIG. 23). A top cover assembly 740 including the assembled components of the top cover 700 is placed on the second half housing 710 (shown in FIG. 24). The first PCB 600 is placed under the top cover assembly 740 and the PCB connector 610 is used to connect the first PCB 600 to the second PCB 605 and the fan 520 to the first PCB 600 (shown in FIG. 25). The terminal block 310 is coupled to the first PCB 600 (shown in FIG. 26). The first half housing 705 is then fixed to the second half housing 710 and the top cover assembly 740 (shown in FIG. 27). In some embodiments, the top cover 700, the first half housing 705, and the second half housing 710 are provided with support ribs to add to the strength of the housing 110. For example, the support ribs may provide additional protection to the housing 110 and the internal components of the single battery pack inverter 100 during a drop event.

In some embodiments, the peak power output of the single battery pack inverter 100 is within a range of approximately 180 W to approximately 220 W (e.g., 200 W) for a short period of time of between about 3 seconds and about 7 seconds (e.g., 5 seconds). For example, the single battery pack inverter 100 is operable to output a peak power output of between about 180 W and about 220 W for at least 5 seconds. In some embodiments, the single battery pack inverter 100 provides a peak output power of approximately 200 W for at least approximately 5 seconds.

In some embodiments, the sustained or continuous maximum output power is within a range of approximately 120 W to 180 W. For example, the single battery pack inverter 100 is operable to output a sustained maximum output power of between about 120 W and about 180 W for at least about 60 minutes. In some embodiments, the sustained or continuous maximum output power is approximately 150 W. The single battery pack inverter 100 may be operable to output a sustained maximum output power of 150 W for at least about 50 minutes.

A runtime at maximum output power for a single battery pack inverter 100 with a single "5S3P" battery pack is within a range of approximately 30 minutes to approximately 120 minutes (e.g., about 75 minutes). In some embodiments, the runtime at maximum output power for the single battery pack inverter 100 with a single "5S3P" battery pack is approximately 75 minutes. A runtime at maximum output power for a single battery pack inverter 100 with a single "5S2P" battery pack is within a range of approximately 20 minutes to approximately 80 minutes (e.g., about 50 minutes). In some embodiments, the runtime at maximum output power for the single battery pack inverter 100 with a single "5S2P" battery pack is approximately 50 minutes. A runtime at maximum output power for a single battery pack inverter 100 with a single "5S1P" battery pack is within a range of approximately 15 minutes to approximately 40 minutes. In some embodiments, the runtime at maximum output power for the single battery pack inverter 100 a single "5S1P" battery pack is approximately 30 minutes.

The USB type-A outlet (i.e., the first DC outlet 410) is capable of providing an output of 2.4 A at 5V. The USB type-C outlet (i.e., the second DC outlet 415) is capable of providing an output of 45 W and also includes the USB type-C standard handshake and communication protocol.

Thus, embodiments described herein provide single battery pack inverter. Various features and advantages are set forth in the following claims.

What is claimed is:

1. A single battery pack inverter comprising:
   a housing;
   a battery pack interface provided on the housing to receive a power tool battery pack;
   an output interface provided on the housing for powering one or more external devices;

an inverter circuit in the housing configured to convert direct-current ("DC") power from the power tool battery pack to alternating-current ("AC") power provided at the output interface;

a fan included within the housing, the fan configured to control an air flow through the single battery pack inverter; and a hanging hook provided on the housing and configured to be pivotable between a first position and a second position, wherein the hanging hook enables the single battery pack inverter to be supported on a support when the hanging hook is in the second position, and wherein the hanging hook is positioned on a surface of the housing when the hanging hook is in the first position.

2. The single battery pack inverter of claim 1, wherein:

the housing has a height within a range of approximately 66 millimeters (mm) to approximately 75 mm;

the housing has a width within a range of approximately 60 mm to approximately 80 mm;

the housing has a depth within a range of approximately 85 mm to approximately 95 mm.

3. The single battery pack inverter of claim 1, wherein a weight of the single battery pack inverter is less than 1 pound.

4. The single battery pack inverter of claim 1, further comprising a fuel gauge indicating a charge level of the power tool battery pack.

5. The single battery pack inverter of claim 1, wherein the hanging hook is fixed on the surface of the housing using a fastening member.

6. The single battery pack inverter of claim 5, wherein the hanging hook includes an L-shaped hanging portion and a pivoting portion.

7. The single battery inverter of claim 6, wherein the fastening member includes:

a flat portion fastened to the surface using the fastening member; and a hook receiving portion having an opening configured to receive the pivoting portion, wherein the hanging hook pivots about the pivoting portion and the hook receiving portion.

8. The single battery pack inverter of claim 7, wherein the L-shaped hanging portion extends from the pivoting portion on a first side of the hook receiving portion, the single battery pack inverter further comprising:

a blocking bar extending from a second side of the hook receiving portion and configured to reduce axial movement of the hanging hook, wherein the blocking bar extends in a direction perpendicular to an axial direction of the pivoting portion.

9. The single battery pack inverter of claim 8, wherein:

the hook receiving portion further comprises a first pair of grooves and a second pair of grooves on the second side of the hook receiving portion;

the blocking bar rests in the first pair of grooves when the hanging portion is pivoted to the first position; and the blocking bar rests in the second pair of grooves when the hanging portion is pivoted to the second position.

10. The single battery pack inverter of claim 9, further comprising a key hole provided on the housing and configured to receive a hanging fastener.

11. The single battery pack inverter of claim 1, wherein the power tool battery pack interface includes:

stepped grooves configured to slidable receive the power tool battery pack; and a terminal block supported on the power tool battery pack interface and configured to mechanically and electrically interface with a corresponding terminal block of the power tool battery pack.

12. A single battery pack inverter comprising:

a housing, the housing including a height within a range of approximately 66 millimeters (mm) to approximately 75 mm, a width within a range of approximately 60 mm to approximately 80 mm, and a depth within a range of approximately 85 mm to approximately 95 mm;

a battery pack interface provided on a first surface of the housing and configured to receive a power tool battery pack;

an output interface provided on a second surface of the housing for powering external devices, the second surface provided on an opposite side of the housing as the first surface, the output interface including an alternating-current ("AC") outlet, and a direct-current ("DC") outlet;

a user interface provided on the second surface of the housing, the user interface including:

an overload indicator configured to be illuminated when a load output of the single battery pack inverter exceeds a predetermined load threshold, an over-temperature indicator configured to be illuminated when a temperature of the single battery pack inverter exceeds a predetermined temperature threshold; and an inverter circuit in the housing for converting DC power from the power tool battery pack to AC power provided at the AC outlet.

13. The single battery pack inverter of claim 12, wherein the user interface further comprises:

an AC output enable button configured to enable and disable the AC outlet; and a DC output enable button configured to enable and disable the DC outlet.

14. The single battery pack inverter of claim 13, wherein:

the AC output enable button is a back-lit push button and is configured to be toggled to enable and disable the AC outlet;

the AC output enable button is illuminated when the AC outlet is enabled; and the AC output enable button is not illuminated when the AC outlet is disabled.

15. The single battery pack inverter of claim 14, wherein:

the DC output enable button is a back-lit push button and is configured to be toggled to enable and disable the DC outlet;

the DC output enable button is illuminated when the DC outlet is enabled; and the DC output enable button is not illuminated when the DC outlet is disabled.

16. The single battery pack inverter of claim 14, wherein the DC outlet is a first DC outlet, the output interface further comprising:

a second DC outlet powered by the battery pack, wherein the DC output enable button is configured to enabled and disable both the first DC outlet and the second DC outlet.

17. The single battery pack inverter of claim 16, wherein the AC outlet, the first DC outlet, and the second DC outlet are configured to be simultaneously enabled.

* * * * *